(12) United States Patent
Yamaguchi

(10) Patent No.: US 11,840,367 B2
(45) Date of Patent: Dec. 12, 2023

(54) SYNTHETIC RESIN MULTILAYER BOTTLE

(71) Applicant: HOKKAI CAN CO., LTD., Hokkaido (JP)

(72) Inventor: Akihiro Yamaguchi, Gunma (JP)

(73) Assignee: Hokkai Can Co., Ltd., Hokkaido (JP)

( * ) Notice: Subject to any disclaimer, the term of this patent is extended or adjusted under 35 U.S.C. 154(b) by 153 days.

(21) Appl. No.: 16/086,973

(22) PCT Filed: Mar. 22, 2017

(86) PCT No.: PCT/JP2017/011398
§ 371 (c)(1),
(2) Date: Sep. 20, 2018

(87) PCT Pub. No.: WO2017/164225
PCT Pub. Date: Sep. 28, 2017

(65) Prior Publication Data
US 2019/0100345 A1 Apr. 4, 2019

(30) Foreign Application Priority Data

Mar. 22, 2016 (JP) ................................. 2016-056595
Apr. 7, 2016 (JP) ................................. 2016-077621
Jul. 6, 2016 (JP) ................................. 2016-134065

(51) Int. Cl.
*B65D 1/32* (2006.01)
*B65D 1/02* (2006.01)
(Continued)

(52) U.S. Cl.
CPC ............ *B65D 1/32* (2013.01); *B29C 49/0005* (2013.01); *B29C 49/0031* (2013.01);
(Continued)

(58) Field of Classification Search
CPC .......... B65D 1/02; B65D 1/0215; B65D 1/32; B29C 49/0005
(Continued)

(56) References Cited

U.S. PATENT DOCUMENTS 4,113,129 A * 9/1978 Cambio, Jr. ............... A61J 1/05
215/380
4,133,129 A * 1/1979 Jelinek ...................... F41A 9/85
42/89
(Continued)

FOREIGN PATENT DOCUMENTS

JP   S59-216654 A   12/1984
JP   H05-77844 A    3/1993
(Continued)

OTHER PUBLICATIONS

Office Action dated Nov. 15, 2022, issued in the corresponding Japanese Patent Application No. 2016-77621.

*Primary Examiner* — Anthony D Stashick
*Assistant Examiner* — Lauren Kmet
(74) *Attorney, Agent, or Firm* — Carrier, Shended & Associates P.C.; Fulchand P. Shende; Joseph P. Carrier

(57) ABSTRACT

A synthetic resin multilayer bottle includes an outer shell bottle and an inner container. The outer shell bottle is capable of restoring itself to its original shape against external pressure. The shoulder portion has a polygonal pyramidal shape, and the bottom portion has a polygonal pyramidal shape, including ridge lines continuing to the extended lines of the polygonal pyramidal ridge lines of the shoulder portion. The inner container includes a an inner container body having a shape extending along the internal shape of the outer shell bottle. It further includes an air passage formed between the outer mouth portion and the inner mouth portion.

9 Claims, 14 Drawing Sheets

(51) Int. Cl.
  *B29C 49/00* (2006.01)
  *B29C 49/22* (2006.01)
  *B29C 49/12* (2006.01)
  *B29K 67/00* (2006.01)
  *B29L 31/00* (2006.01)
  *B32B 1/02* (2006.01)
  *B32B 27/08* (2006.01)
  *B32B 27/36* (2006.01)

(52) U.S. Cl.
  CPC ............... *B29C 49/22* (2013.01); *B65D 1/02* (2013.01); *B65D 1/0215* (2013.01); *B29C 49/12* (2013.01); *B29K 2067/003* (2013.01); *B29L 2031/7158* (2013.01); *B32B 1/02* (2013.01); *B32B 27/08* (2013.01); *B32B 27/36* (2013.01); *B32B 2250/244* (2013.01); *B32B 2439/60* (2013.01)

(58) Field of Classification Search
  USPC ......................................................... 215/12.1
  See application file for complete search history.

(56) References Cited

U.S. PATENT DOCUMENTS 5,301,838 A    4/1994  Schmidt et al.
  2015/0171287 A1*  6/2015  Matsumura ........... H01L 33/507
                                                                     438/27

FOREIGN PATENT DOCUMENTS

| | | | | |
|---|---|---|---|---|
| JP | H06-505463 A | | 6/1994 | |
| JP | 06239332 A | * | 8/1994 | ......... B65D 83/0066 |
| JP | H06-239332 A | | 8/1994 | |
| JP | H08-198233 A | | 8/1996 | |
| JP | 2001-171699 A | | 6/2001 | |
| JP | 2006-501109 A | | 1/2006 | |
| JP | 3872651 B2 | * | 1/2007 | |
| JP | 3872651 B2 | | 1/2007 | |
| JP | 1341757 S | | 10/2008 | |
| JP | 2009-102057 A | | 5/2009 | |
| JP | 2009-179403 A | | 8/2009 | |
| JP | 2009-241971 A | | 10/2009 | |
| JP | 2010082916 A | * | 4/2010 | |
| JP | 2012-206736 A | | 10/2012 | |
| JP | 2012-214412 A | | 11/2012 | |
| JP | 2012214412 A | * | 11/2012 | |
| JP | 1463550 S | | 3/2013 | |
| JP | 1463550 S | * | 3/2013 | |
| JP | 5168572 B2 | | 3/2013 | |
| JP | 2013-245010 A | | 12/2013 | |
| JP | 1494473 S | | 4/2014 | |
| JP | 2014-091538 A | | 5/2014 | |
| JP | 2015-224070 A | | 12/2015 | |
| JP | 1542215 S | | 1/2016 | |
| JP | 1542215 S | * | 1/2016 | |
| JP | 1549493 S | | 5/2016 | |

* cited by examiner

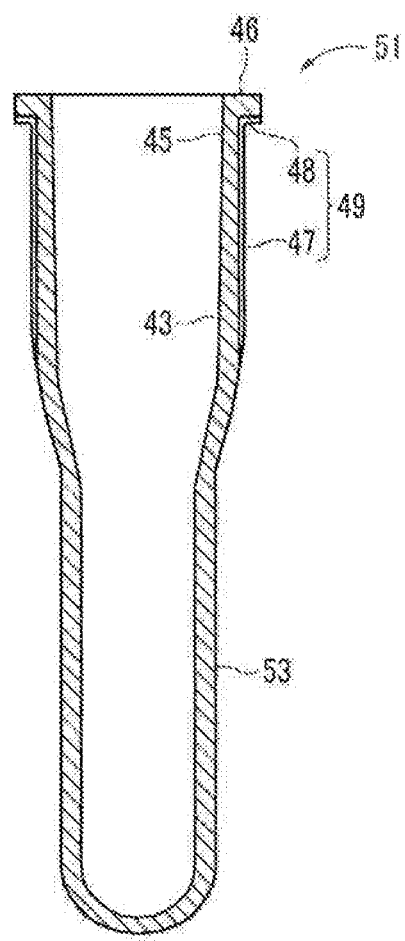

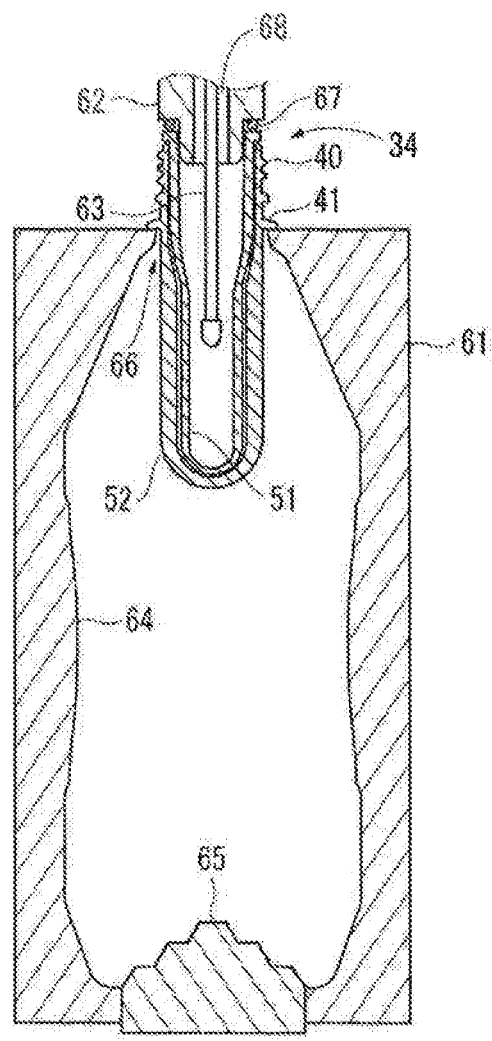

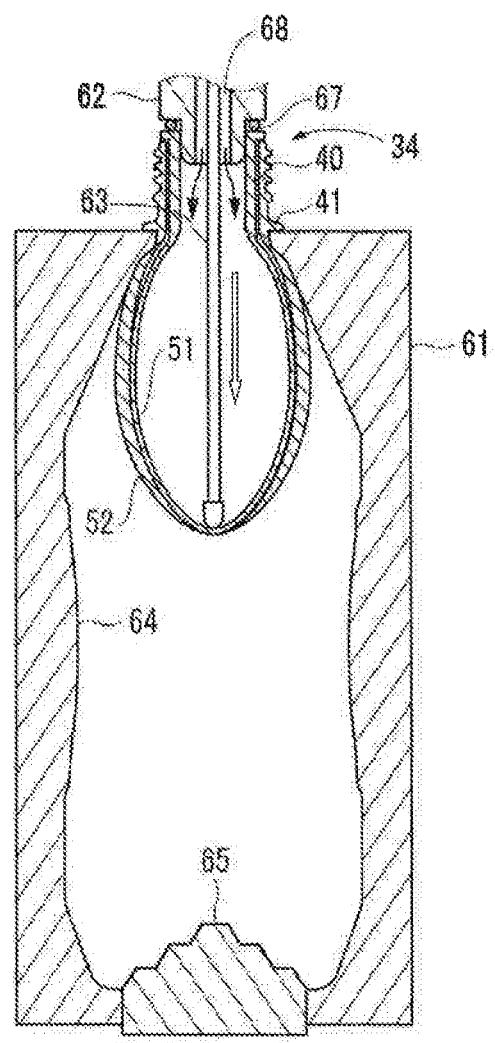

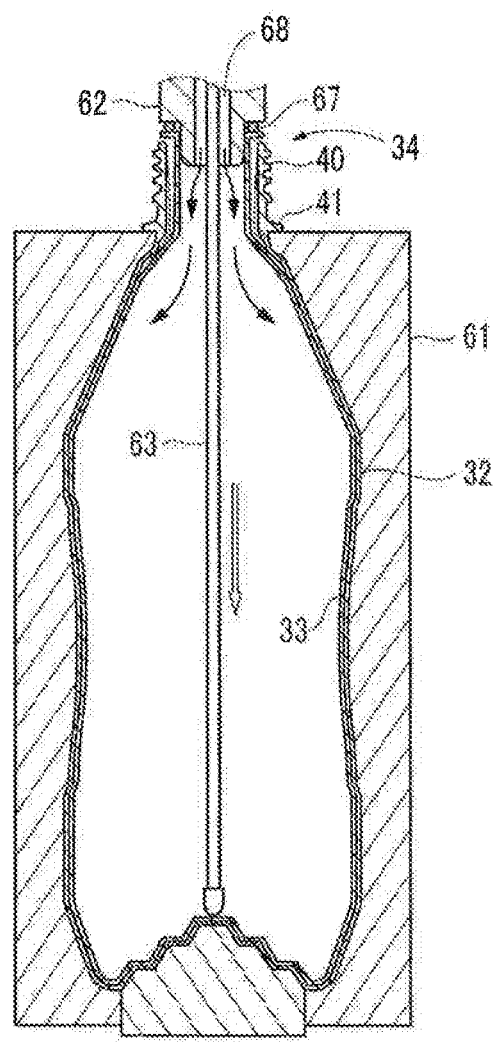

US 11,840,367 B2

SYNTHETIC RESIN MULTILAYER BOTTLE

TECHNICAL FIELD

The present invention relates to a synthetic resin multilayer bottle.

BACKGROUND ART

Traditionally, synthetic resin multilayer bottles are known, in which an inner container that undergoes deformation under application of external pressure causing reduction in its volume (which may hereinafter be referred to as "volume-reduction deformation") is arranged inside an outer shell bottle that is capable of restoring itself to its original shape against external pressure such that outside air is allowed to be introduced into a gap between the shell bottle and the container.

According to this synthetic resin multilayer bottle, the contents contained in the inner container is poured out by pressing the body portion of the outer shell bottle and thereby causing the volume-reduction deformation of the inner container. When the body portion of the outer shell is taken out of the pressed state, outside air is introduced into the gap between the outer shell bottle and the inner container. As a result, the outer shell bottle is restored to its original shape due to the outside air pressure, while the inner container body is maintained in a deformed state with its volume maintained in the reduced state as well. In such operations, since intrusion of the outside air into the inner container does not occur, it is possible to prevent the content contained in the inner container from deteriorating due to oxidation or the like.

In the meantime, the problem that the synthetic resin multilayer bottle may face is that, when the inner container is deformed with its volume reduced in the above-described manner, the volume-reduction deformation occurs unevenly in the longitudinal direction or the radial direction (which is a width direction in the case of a rectangular bottle) of the body portion of the inner container, making it difficult to pour out the contents sufficiently with a lot of liquid remaining inside.

In order to solve the above problem, a known multilayer bottle has a recessed portion or a groove formed on the outer peripheral surface of the inner container so as to allow deformation along the recessed portion or the groove (for example, see Patent Literature 1).

CITATION LIST

Patent Literature

Patent Literature 1: Japanese Patent No. 3872651
Patent Literature 2: Japanese Patent Application Laid-Open No. 2013-245010
Patent Literature 3: Japanese Patent No. 5168572

SUMMARY OF INVENTION

Technical Problem

However, the downside of the above-described traditional multilayer bottle is that the manufacturing method becomes complicated because the recessed portion or groove need to be formed on the outer peripheral surface of the inner container.

It is an object of the present invention to overcome such inconvenience and to provide a synthetic resin multilayer bottle that can be readily manufactured and achieve reduction of the remaining liquid of the contents.

In addition, if the above-mentioned synthetic resin multilayer bottle is a blow-molded multilayer bottle made of polyester resin, another object of the present invention is to provide a polyester resin blow-molded multiplayer bottle that can be manufactured using an apparatus of a simple structure and achieves appropriate prevention of separation of the inner container from the outer shell bottle at the bottle's bottom portion.

Further, if the above-mentioned synthetic resin multilayer bottle is a blow-molded multilayer bottle made of polyester resin, still another object of the present invention is to provide a polyester resin blow-molded multilayer bottle which uses a release agent capable of properly separating the outer shell bottle and the inner container with each other.

Solution to Problem

In order to attain these objectives, a synthetic resin multilayer bottle according to a first aspect of the present invention is characterised by the fact that it includes an outer shell bottle including a cylindrical outer mouth portion, a shoulder portion connected to the outer mouth portion, a body portion connected to the shoulder portion, a bottom portion connected to the body portion, and a ground contact portion connected to the bottom portion, wherein the outer shell bottle is capable of restoring itself to its original shape against external pressure, the shoulder portion has a polygonal pyramidal shape at least at a portion thereof connected to the outer mouth portion, the body portion has a circular cross section orthogonal to an axis, and the bottom portion has a polygonal pyramidal shape at least at a portion thereof connected to the ground contact portion, the polygonal pyramidal shape having ridge lines continuing to extended lines of polygonal pyramidal ridge lines of the shoulder portion; an inner container, including a cylindrical inner mouth portion arranged on an inner peripheral side of the cylindrical outer mouth portion of the outer shell bottle, and an inner container body connected to the inner mouth portion and having a shape extending along an internal shape of the outer shell bottle, the inner container being deformed by external pressure; and an air passage formed between the outer mouth portion and the inner mouth portion and introducing outside air into a gap between the outer shell bottle and the inner container.

In accordance with the synthetic resin multilayer bottle according to the first aspect of the present invention having the above-described configuration, when the outer mouth portion and the inner mouth portions are oriented downward and the body portion of the outer shell bottle is pressed, the inner container body of the inner container is deformed with its volume reduced and the contents are poured out. Subsequently, when the body portion of the outer shell bottle is taken out of the pressed state, the outside air is introduced from the air passage into the gap between the outer shell bottle and the inner container body. While the outer shell bottle is restored to its original shape by the outside air pressure, the inner container body is maintained in the deformed state with its reduced volume maintained as well.

At this point, since the contents are concentrated in the direction toward the inner mouth portion by gravity, deformation of the inner container body begins (hereinafter abbreviated as "valley folding deformation"), where the inner container body is depressed inwardly at the portion corresponding to the polygonal pyramidal portion of the bottom portion connected to the ground contact portion of the outer shell bottle to the side portion corresponding to the portion between the polygonal pyramidal ridge lines of the inner container body.

According to the synthetic resin multilayer bottle in accordance with the first aspect of the present invention, a portion of the bottom portion connected to the ground contact portion of the outer shell bottle has a polygonal pyramidal shape, and the inner container body has a shape extending along the internal shape of the outer shell bottle. As such, the valley folding deformation is expected to begin with the valley fold deformed portion being created by the side portion having a smaller strength which has been is inwardly folded, for the portion corresponding to the polygonal pyramidal ridge lines in the inner container body acts as a rib and has a larger strength than that of the side portion between the ridge lines.

According to the synthetic resin multilayer bottle in accordance with the first aspect of the present invention, the contents in the inner container decrease gradually by repeated pressing and stoppage of the pressing of the body portion of the outer shell bottle, and in response to the decrease of the contents, the valley folding deformation begins from the portion corresponding to the portion connected to the ground contact portion of the bottom portion of the outer shell bottle, proceeds in the width direction from the outside to the inside of the inner container body, and proceeds in the length direction from the portion corresponding to the portion connected to the ground contact portion of the bottom portion of the outer shell bottle toward the inner mouth portion.

When the contents further decrease, the valley folding deformation of the inner container body eventually reaches the portion corresponding to the portion connected to the outer mouth portion of the shoulder portion of the outer shell bottle. At this point, the polygonal pyramidal ridge line of the portion connected to the outer mouth portion of the shoulder portion is found on the extended line from the polygonal pyramidal ridge line of the portion connected to the ground contact portion of the bottom portion. Accordingly, the valley folding deformation in the inner container body will proceed toward the side portion corresponding to the portion between the polygonal pyramidal ridge lines of the portion connected to the outer mouth portion of the shoulder portion.

At this point, the portion corresponding to the polygonal pyramidal ridge line of the portion connected to the outer mouth portion of the shoulder portion in the inner container body acts as a rib similarly to the portion corresponding to the polygonal pyramidal ridge line of the portion connected to the ground contact portion of the bottom portion. Accordingly, the portion corresponding to the polygonal pyramidal ridge line of the portion connected to the outer mouth portion of the shoulder portion in the inner container body has a strength larger than that of the side portion corresponding to the portion between the ridge lines and the side portion is easily valley-folded in a shape continuing to the valley folding deformation.

As a result, the valley folding deformation will proceed for the entire inner container body in the diagonal direction from the outside to the inside of the inner container body, and in the length direction from portion corresponding to the portion connected to the ground contact portion of the bottom portion of the outer shell bottle toward the inner mouth portion, so that the remaining liquid of the contents can be reduced.

In addition, according to the synthetic resin multilayer bottle in accordance with the first aspect of the present invention, as described above, the inner container body has a shape extending along the internal shape of the outer shell bottle. Accordingly, the synthetic resin multilayer bottle of the present invention does not require an operation of combining a separately prepared inner container with an outer shell bottle or a like operation and can be readily manufactured, for example, by placing a preform for forming the outer shell bottle on a preform for forming the inner container body and performing blow-molding on these preforms at the same time.

In accordance with the synthetic resin multilayer bottle according to the first aspect of the present invention, the shoulder portion of the outer shell bottle should have a polygonal pyramidal shape at least at a portion connected to the outer mouth portion but does not need to have a fully polygonal pyramidal shape. In this case, the shoulder portion may have a circular cross section orthogonal to the axis at the portion connected to the body portion.

In addition, in accordance with the synthetic resin multilayer bottle according to the first aspect of the present invention, the bottom portion of the outer shell bottle should have a polygonal pyramidal shape at least at a portion connected to the ground contact portion but does not need to have a fully polygonal pyramidal shape. In this case, the bottom portion may have a circular cross section orthogonal to the axis at the portion connected to the body portion.

Further, in accordance with the synthetic resin multilayer bottle according to the first aspect of the present invention, the body portion is in the form of a round bottle having a circular cross section orthogonal to the axis and, in contrast to a bottle with a square shape, the body portion can be grasped and squeezed by any position thereof when it is actually grasped (it will be smoothly pressed and deformed by the pressing force of the hand and restored to its original shape smoothly upon being taken out of the application of the pressing force). Also, the synthetic resin multilayer bottle does not need to be bothered by the positioning of a label when affixing it on the bottle and excellent workability can be obtained. At this point, the body portion may have a cylindrical shape having the same diameter from a portion where the cross section orthogonal to the axis is connected with the shoulder portion to a portion connected to the bottom portion. Meanwhile, it is preferable that the body portion have a shape of a hand drum that gradually decreases in diameter from the portion connected to the shoulder portion toward the central portion and gradually increases in diameter from the central portion toward the portion connected to the bottom portion.

Since the body portion has a shape of a hand drum with its central portion having a small diameter relative to the portions connected to the shoulder portion or the bottom portion, the body portion can be grasped and easily pressed by the hand-drum-like portion or taken out of the pressed state. As a result, the synthetic resin multilayer bottle according to the first aspect of the present invention can obtain excellent squeezing property (namely the property of restoring itself to its original shape smoothly when pressed and deformed smoothly by a pressing force of a hand and then taken out of the pressed state).

In addition, in accordance with the synthetic resin multilayer bottle according to the first aspect of the present invention, it is preferable that the body portion includes a plurality of ribs along the axial direction. In the synthetic resin multilayer bottle according to the present invention, since the body portion has the plurality of ribs, to grasp the body portion can be more readily grasped and more excellent squeeze property can be obtained.

Next, a synthetic resin multilayer bottle according to a second aspect of the present invention is characterised by the fact that it includes an outer shell bottle including a cylindrical outer mouth portion, a polygonal pyramidal shoulder portion connected to the outer mouth portion, a polygonal prism-like upper body portion connected to the shoulder portion and including ridge lines continuing to the polygonal pyramidal ridge lines, an intermediate body portion connected to the upper body portion, and a polygonal prism-like lower body portion connected to the intermediate body portion and including ridge lines continuing to extended lines of ridge lines of the polygonal prism-like upper body portion, and a bottom portion connected to the lower body portion, wherein the outer shell bottle is capable of restoring itself to its original shape against external pressure; an inner container including a cylindrical inner mouth portion arranged on an inner peripheral side of the cylindrical outer mouth portion of the outer shell bottle, and an inner container body connected to the inner mouth portion and having a shape extending along an internal shape of the outer shell bottle, the inner container being deformed by external pressure; and an air passage formed between the outer mouth portion and the inner mouth portion and introducing outside air into a gap between the outer shell bottle and the inner container.

The synthetic resin multilayer bottle according to the second aspect of the present invention includes an outer shell bottle capable of restoring itself to its original shape against external pressure and an inner container accommodated inside the outer shell bottle and adapted to be deformed by external pressure. The outer shell bottle includes a polygonal pyramidal shoulder portion connected to the outer mouth portion, a polygonal prism-like upper body portion connected to the shoulder portion, and a intermediate body portion connected to the upper body portion, a polygonal prism-like lower body portion connected to the intermediate body portion. The ridge line of the polygonal prism-like upper body portion continues to the ridge line of the polygonal pyramidal shoulder portion and the ridge line of the polygonal prism-like lower body portion is found on an extended line of the ridge line of the upper body portion.

In addition, the inner container has a cylindrical inner mouth portion arranged on the inner peripheral surface of the outer mouth portion, and an inner container body connected to the inner mouth portion and having a shape extending along the shape of the inner surface of the outer shell bottle, and includes an air passage formed between the outer mouth portion and the inner mouth portion for introducing the outside air into the gap between the outer shell bottle and the inner container body.

In accordance with the synthetic resin multilayer bottle according to the second aspect of the present invention, when the intermediate body portion of the outer shell bottle is pressed with the outer mouth portion and the inner mouth portion oriented downward, the inner container body of the inner container is deformed with its volume reduced and the contents are discharged. Next, when the intermediate body portion of the outer shell body is taken out of the pressed state, the outside air is introduced via the air passage into the gap between the outer shell bottle and the inner container body. While the outer shell bottle is restored to its original shape by the outside air pressure, the inner container body is maintained in the deformed state with its reduced volume maintained as well.

At this point, since the contents are concentrated in the direction toward the inner mouth portion by gravity, the valley folding deformation of the inner container body is started, where the inner container body is depressed inwardly with a valley fold deformed portion created from the portion corresponding to the lower body portion of the outer shell bottle to the side portion corresponding to the portion between the polygonal prism-like ridge lines of the inner container body.

In accordance with the synthetic resin multilayer bottle according to the second aspect of the present invention, the lower body portion of the outer shell bottle has a polygonal prism-like shape and the inner container body has a shape extending along the internal shape of the outer shell bottle. As such, the valley folding deformation is expected to begin with the inwardly folded and valley folding deformed portion being created at the side portion having a smaller strength, for the portion corresponding to the polygonal prism-like ridge lines of the inner container body acts as a rib and has a larger strength than that of the side portion corresponding to the portion between the ridge lines.

In accordance with the synthetic resin multilayer bottle according to the second aspect of the present invention, the contents decrease gradually by repeated pressing and stoppage of the pressing of the intermediate body portion of the outer shell bottle. As the contents decrease gradually, the valley folding deformation of the inner container body of the inner container begins from the portion corresponding to the lower body portion of the outer shell bottle, proceeds from the outside to the inside of the inner container body in the width direction and proceeds from the portion corresponding to the lower body portion of the outer shell bottle toward the inner mouth portion in the length direction.

When the contents further decrease, the valley folding deformation of the inner container body eventually reaches the portion corresponding to the shoulder portion from the upper body portion of the outer shell bottle. At this point, the ridge line of the upper body portion is found on the extended line from the ridge line of the lower body portion and the ridge line of the shoulder portion continues to the ridge line of the upper body portion. Accordingly, the valley folding deformation in the inner container body will proceed toward the side portion corresponding to the portion between the ridge lines of the upper body portion and the ridge lines of the shoulder portion.

At this point, the portion corresponding to the ridge line of the upper body portion and the ridge line of the shoulder portion of the inner container body acts as a rib similarly to the portion corresponding to the ridge line of the lower body portion. Accordingly, the strength of the portion corresponding to the ridge line of the upper body portion and the ridge line of the shoulder portion of the inner container body becomes larger than that of the side portion corresponding to the portion between the ridge lines, so that the side portion is easily valley-folded in a shape continuing to the valley folding deformation.

As a result, the valley folding deformation will proceed for the entire inner container body in the diagonal direction from the outside to the inside of the inner container body and in the length direction from the portion corresponding to the lower body portion of the outer shell bottle toward the inner mouth portion, so that the remaining liquid of the contents can be reduced.

In addition, in accordance with the synthetic resin multilayer bottle according to the second aspect of the present invention, as described above, the inner container has a shape extending along the inner shape of the outer shell bottle. Therefore, the synthetic resin multilayer bottle of the present invention does not require an operation of combining a separately prepared inner container with an outer shell bottle, so that it can be readily manufactured, for example, by placing a preform for forming the outer shell bottle on the preform for forming the inner container and performing blow-molding on these preforms at the same time.

In accordance with the synthetic resin multilayer bottle according to the second aspect of the present invention, it suffices that the upper body portion and the lower body portion have a polygonal prism-like shape, and the intermediate body portion does not need to have a polygonal prism-like shape. In this case, the intermediate body portion may have a shape that reversibly changes in volume due to external pressure, for example.

The synthetic resin multilayer bottle according to the first aspect or the second aspect of the present invention can be configured, for example, as a synthetic resin blow-molded multilayer bottle.

At this point, the synthetic resin blow-molded multilayer bottle will face the problem that, when the inner container is released from the outer shell bottle at the bottom portion thereof when the inner container is deformed with its volume reduced as described above, it is difficult to perform desired volume-reduction deformation, which in turn makes it difficult to pour out the contents sufficiently.

In order to solve the above-identified problem, a known synthetic resin blow-molded multilayer bottle that includes a retaining rib for sandwiching and holding the inner container integrally with the outer shell bottle at the bottom portion of the bottle (for example, see Patent Literature 2).

However, according to the traditional synthetic resin blow-molded multilayer bottle, it is necessary to apply an external force to the holding rib so as to create a structure in which the inner container is sandwiched by the outer shell bottle. The external force is applied, for example, by a pin protruding from the pinch-off portion of the mold at the time of the blow molding, and the downside of such a multilayer bottle is that the configuration of the apparatus for use in manufacturing the synthetic resin blow-molded multilayer bottle becomes complicated.

In view of the above, a polyester resin blow-molded multilayer bottle according to a third aspect of the present invention is characterised by the fact that it includes an outer shell bottle including a cylindrical outer mouth portion, a shoulder portion connected to the outer mouth portion, a body portion connected to the shoulder portion, a bottom portion connected to the body portion and having a recessed portion raised on the inner peripheral side into the bottle, wherein the outer shell bottle is capable of restoring itself to its original shape against external pressure; an inner container including a cylindrical inner mouth portion arranged on an inner peripheral side of the cylindrical outer mouth portion of the outer shell bottle, and an inner container body connected to the inner mouth portion and having a shape extending along an internal shape of the outer shell bottle, the inner container being deformed by external pressure; and an air passage formed between the outer mouth portion and the inner mouth portion and introducing outside air into a gap between the outer shell bottle and the inner container, wherein the recessed portion has a frustum shape and the inner container is in tight contact with the outer shell bottle at the recessed portion.

The polyester resin multilayer bottle according to the third aspect of the present invention can be manufactured by arranging, on the inner peripheral side of the outer preform formed by injection molding using polyester resin, the inner preform formed in the same manner and performing the blow molding on these preforms at the same time and includes an outer shell bottle capable of restoring itself into its original shape against external pressure and an inner container arranged inside the outer shell bottle and adapted to be deformed under application of external pressure. Also, the polyester resin multilayer bottle according to the third aspect of the present invention is provided with an air passage for introducing outside air into a gap between the outer shell bottle and the inner container.

In accordance with the polyester resin blow-molded multilayer bottle according to the third aspect of the present invention, by pressing the body portion of the outer shell bottle with the outer mouth portion and the inner mouth portion oriented downward, the inner container body of the inner container is deformed with its volume reduced and the contents are poured out. Next, when the body portion of the outer shell bottle is taken out of the pressed state, the outside air is introduced via the air passage into the gap between the outer shell bottle and the inner container body. While the outer shell bottle is restored to its original shape by the outside air pressure, the inner container body is maintained in the state of the volume-reduction deformation.

At this point, in accordance with the polyester resin blow-molded multilayer bottle according to the third aspect of the present invention, the bottom portion has a recessed portion that is raised inwardly in the bottle, and the recessed portion has a frustum shape. Since the recessed portion has the above-described shape, the inner preform is thermocompression-bonded to the outer preform in the blow molding process, and the inner container is brought into tight contact with the outer shell bottle at the recessed portion.

At the recessed portion, as described above, the inner container is tightly attached to the outer shell bottle. As a result, the recessed portion makes it difficult for the outside air introduced via the air passage to enter the gap between the inner container and the outer shell bottle, and separation of the inner container from the outer shell bottle can be reliably prevented.

The recessed portion should have a frustum shape but may have a polygonal frustum-like shape or a truncated cone-like shape. Meanwhile, since the inner preform is readily thermocompression-bonded to the outer preform in the blow molding process, it is preferable that the recessed portion has a polygonal frustum-like shape.

The polyester resin blow-molded multilayer bottle according to the third aspect of the present invention can be readily manufactured by using a mold for imparting the above-described shape to the recessed portion, arranging the inner preform on the inner peripheral side of the outer preform, and simply performing blow molding in this state.

In addition, in accordance with the polyester resin blow-molded multilayer bottle according to the third aspect of the present invention, it is preferable that the recessed portion has a shape in which polygonal frustums are stacked in multiple stages.

Since the recessed portion has a shape in which the polygonal frustums are stacked in multiple stages, the recessed portion is allowed to include numerous stepped portions and bent portions. While it is made possible to enhance the contact property between the inner container body and the outer shell bottle during blow molding, it is also made possible to further effectively prevent the outside air introduced via the air passage from entering the gap between the inner container body and the outer shell bottle.

Meanwhile, as described above, the polyester resin blow-molded multilayer bottle may involve a problem that the inner container is brought into tight contact with the outer shell bottle due to heat and pressure during the simultaneous blow molding of the inner and outer preforms in a state where the inner preform is arranged on the inner peripheral side of the outer preform, so that the outer shell bottle and the inner container cannot be easily separated from each other. This problem is particularly conspicuous when the polyester resin for forming the polyester resin blow-molded multilayer bottle is polyethylene terephthalate.

In order to solve the above problem, a polyester resin blow-molded multilayer bottle having a release agent layer made of a silicone oil between an outer shell bottle and an inner container has been proposed (for example, see Patent Literature 3).

However, the traditional polyester resin blow-molded multilayer bottle is not successful in sufficiently solving the above-identified problem, for the outer shell bottle and the inner container may not be easily separated depending on the cases even if the release agent layer comprising the silicone oil is provided. Thus, further improvement is desired.

In view of the above, a polyester resin blow-molded multilayer bottle according to a fourth aspect of the present invention is characterised by the fact that it includes an outer shell bottle including a cylindrical outer mouth portion, a shoulder portion connected to the outer mouth portion, a body portion connected to the shoulder portion, and a bottom portion connected to the body portion and having a recessed portion raised on the inner peripheral side into the bottle, wherein the outer shell bottle is capable of restoring itself to its original shape against external pressure; an inner container including a cylindrical inner mouth portion arranged on an inner peripheral side of the cylindrical outer mouth portion of the outer shell bottle, and an inner container body connected to the inner mouth portion and having a shape extending along an internal shape of the outer shell bottle, the inner container being deformed by external pressure; and an air passage formed between the outer mouth portion and the inner mouth portion and introducing outside air into a gap between the outer shell bottle and the inner container, wherein the polyester resin blow-molded multilayer bottle further comprises a release agent layer containing liquid paraffin, the release agent layer being provided at least between the shoulder portion, the body portion, and the bottom portion except for the recessed portion of the outer shell bottle and the portion of the inner container extending along the shoulder portion, the body portion, and the bottom portion except for the recessed portion.

The polyester resin blow-molded multilayer bottle according to the fourth aspect of the present invention includes a release agent layer containing liquid paraffin provided at least between the shoulder portion, the body portion of the outer shell bottle, and the bottom portion except for the recessed portion, and the portion of the inner container extending along the shoulder portion, body portion, and the bottom portion except for he recessed portion. As such, in accordance with the polyester resin blow-molded multilayer bottle according to the fourth aspect of the present invention, when body portion of the outer shell bottle is pressed to deform the inner container with its volume reduced, the contents contained in the inner container are poured out, and after that the body portion is taken out of the pressed state and the outside air is introduced into the gap between the outer shell bottle and the inner container, then the inner container can be properly separated from the outer shell bottle at the portion extending along the shoulder portion, the body portion, and the bottom portion except for the recessed portion.

In a polyester resin blow-molded multilayer bottle, when the portion of the inner container extending along the recessed portion is separated, at the bottom portion thereof, from the recessed portion of the outer shell bottle, it becomes difficult to deform the inner container into a desired shape, which makes it difficult to sufficiently pour out the contents.

However, the polyester resin blow-molded multilayer bottle according to the fourth aspect of the present invention includes a release agent layer provided at least between the shoulder portion, the body portion, and the bottom portion except for the recessed portion of the outer shell bottle, and the portion of the inner container extending along the shoulder portion, body portion, and the bottom portion except for he recessed portion.

Accordingly, in accordance with the polyester resin blow-molded multilayer bottle according to the fourth aspect of the present invention, the recessed portion is not provided with the release agent layer, and at the bottom portion thereof, it is made possible to more effectively prevent the portion of the inner container extending along the recessed portion from being separated from the recessed portion of the outer shell bottle.

The polyester resin blow-molded multilayer bottle according to the fourth aspect of the present invention can be particularly preferably used when it is made of polyethylene terephthalate resin.

In addition, the release agent of the present invention used in the polyester resin blow-molded multilayer bottle is characterized by the fact that it contains liquid paraffin having Saybolt universal viscosity in the range of 75 to 300 SUS at 100 degrees Fahrenheit (° F.).

The release agent of the present invention contains liquid paraffin having Saybolt universal viscosity within the above range, and the release agent layer can be easily formed between the shoulder portion and the body portion of the outer shell bottle and the portion of the inner container extending along the shoulder portion and the body portion, which makes it possible to properly separate the inner container from the outer shell bottle.

In accordance with the release agent of the present invention, the applied release agent drips when the Saybolt universal viscosity at 100° F. is less than 75 SUS, and the applied release agent becomes thick when it exceeds 300 SUS, and in either case the workability at the time of forming the release agent layer is deteriorated. In the release agent of the present invention, the liquid paraffin preferably has a Saybolt universal viscosity in the range of 159 to 175 SUS at 100° F. so that the release agent layer can be formed more easily. The release agent of the present invention can be applied by selecting liquid paraffin having an appropriate viscosity according to the working environment, for example, working temperature etc., and setting the working conditions appropriately.

Note that the Saybolt universal viscosity is a viscosity represented by the time (second) during which a 60 milliliter sample flows out of the Saybolt universal viscometer, and the unit thereof is Saybolt universal second (SUS).

The polyester resin blow-molded multilayer bottle according to the fourth aspect of the present invention is manufactured by simultaneous blow-molding of the inner and outer preforms in a state where the inner preform is arranged on the inner peripheral side of the outer preform.

The outer preform used for manufacturing the polyester resin blow-molded multilayer bottle includes an outer mouth portion having the same shape as that of the outer mouth portion of the outer shell bottle and a bottomed cylindrical body connected to the outer mouth portion, and forms the outer shell bottle by blow molding. As such, in accordance with the present invention, a release agent containing liquid paraffin is applied to the inner surface of at least the portion of the outer preform except for the bottom portion of the bottomed cylindrical body. At this point, it is made possible to easily prevent the release agent from adhering to the bottom portion by keeping the outer preform in an inverted state with the outer mouth portion oriented downward.

The outer preform on which the release agent is applied as described above is subjected to the blow molding simultaneously with the inner preform in a state where the inner preform is arranged on the inner peripheral side of the outer preform, and thus the polyester resin blow-molded multilayer bottle can be formed in accordance with the fourth aspect of the present invention.

BRIEF DESCRIPTION OF DRAWINGS

FIG. 10 is a longitudinal cross-sectional view illustrating a configuration of an inner preform for use in manufacturing a polyester resin blow-molded multilayer bottle according to a third aspect of the present invention.

FIG. 12A is an explanatory cross-sectional view illustrating an initial process of a method for manufacturing the polyester resin blow-molded multilayer bottle according to the third aspect of the present invention.

FIG. 12B is an explanatory cross-sectional view illustrating a blow molding step of the method for manufacturing the polyester resin blow-molded multilayer bottle according to the third aspect of the present invention.

FIG. 12C is an explanatory cross-sectional view illustrating an end stage of the blow molding step in the method for manufacturing the polyester resin blow-molded multilayer bottle according to the third aspect of the present invention.

DESCRIPTION OF EMBODIMENTS

Embodiments of the present invention will be described further in detail below with reference to the accompanying drawings.

A synthetic resin multilayer bottle 1 according to a first aspect of the present invention will first be described with reference to FIGS. 1 to 5. The synthetic resin multilayer bottle 1 according to the first aspect can be made of polyester resin, for example.

Figure 1:
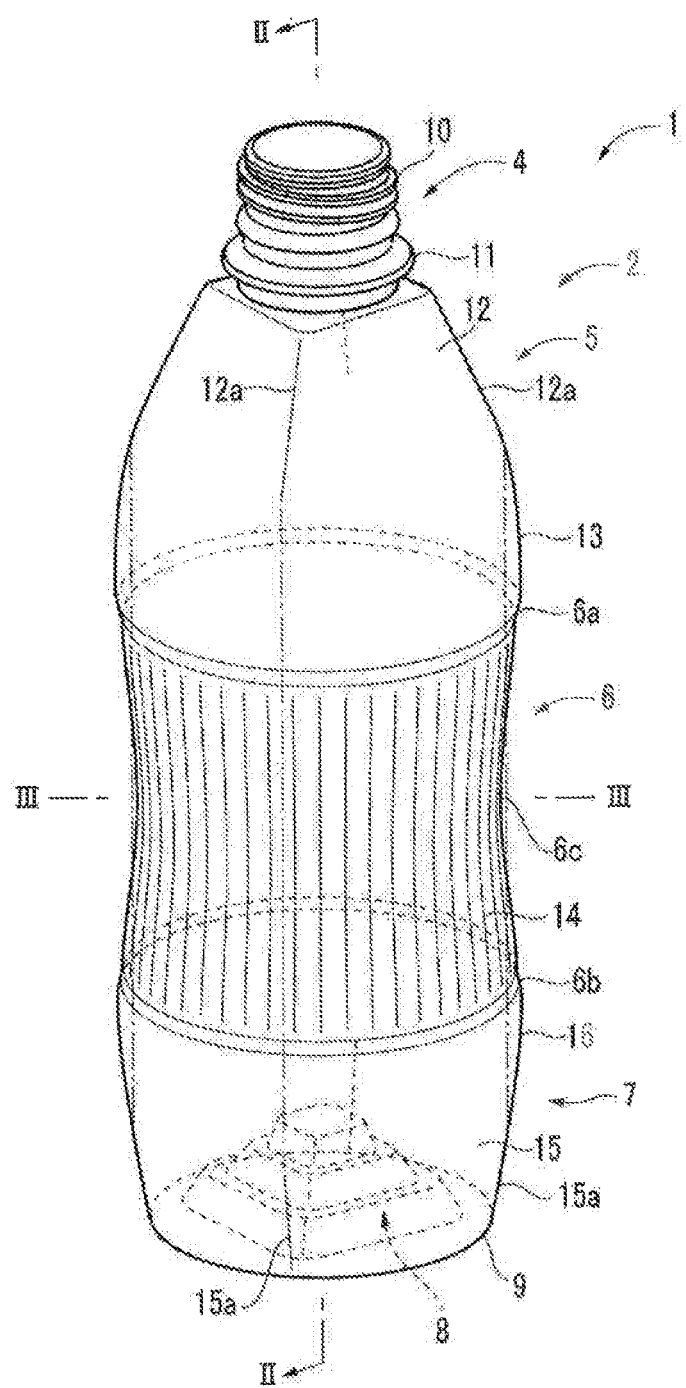
FIG. 1 is a perspective view illustrating a configuration of a synthetic resin multilayer bottle according to a first aspect of the present invention.
Figure 2:
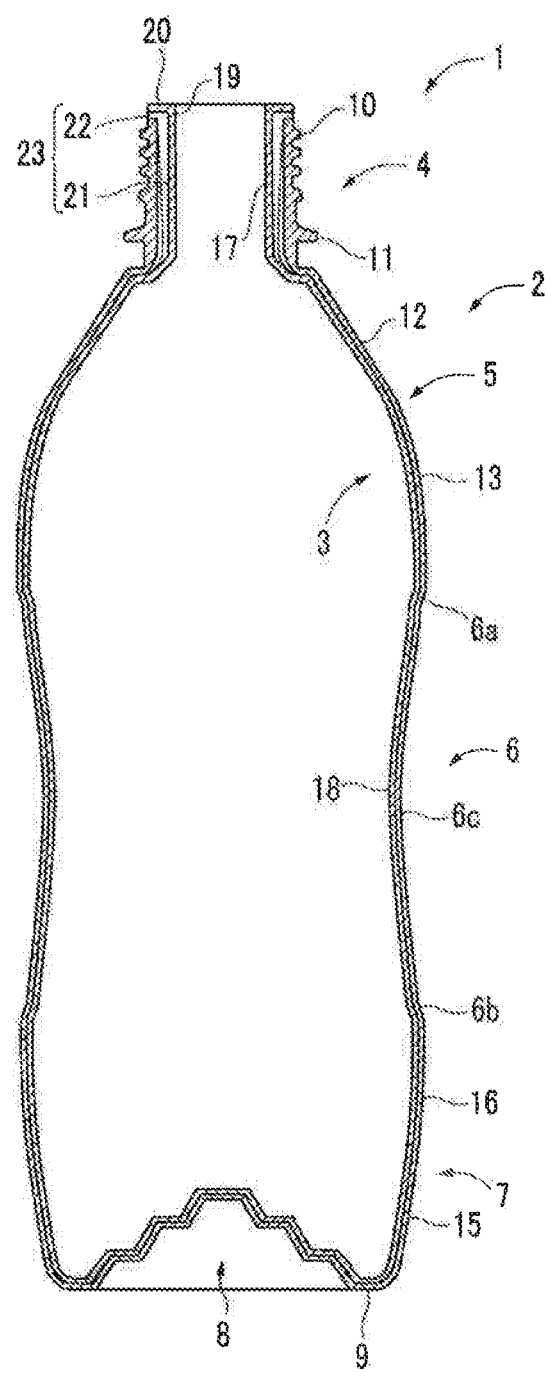
FIG. 2 is a cross-sectional view taken along the line II-II of FIG. 1.

As illustrated in FIGS. 1 and 2, the synthetic resin multilayer bottle 1 includes an outer shell bottle 2 capable of restoring itself to its original shape against external pressure and an inner container 3 accommodated inside the outer shell bottle 2 and adapted to be deformed by external pressure.

The outer shell bottle 2 includes a cylindrical outer mouth portion 4, a shoulder portion 5 connected to the outer mouth portion 4, a body portion 6 connected to the shoulder portion 5, and a bottom portion 7 connected to the body portion 6. The bottom portion 7 has a recessed portion 8 which is raised inwardly from the outer shell bottle 2 to give self-standing capability to the synthetic resin multilayer bottle 1 on the inner peripheral side, where the portion defined between the bottom portion 7 and the recessed portion 8 serves as a ground contact portion 9.

The outer mouth portion 4 includes an external thread portion 10 and a support ring 11 on the outer peripheral surface thereof. The portion of the shoulder portion 5 in contact with the outer mouth portion 4 defines a quadrangular pyramidal portion 12. At the lower side of quadrangular pyramidal portion 12, the shoulder portion 5 includes an upper body portion 13 connected to the body portion 6. The diameter of the upper body portion 13 gradually increases away from the quadrangular pyramidal portion 12 toward the body portion 6 with the corners of the quadrangular pyramid gradually rounded corresponding to the increase in the diameter.

The body portion 6 has a circular cross section orthogonal to its axis and is connected to the upper body portion 13 of the shoulder portion 5 via a stepped portion 6a on one hand and is connected on the other hand to the bottom portion 7 via a stepped portion 6b. The stepped portion 6a gradually decreases in diameter from the shoulder portion 5 toward the body portion 6 while the stepped portion 6b gradually decreases in diameter from the bottom portion 7 toward the body portion 6.

Figure 3:
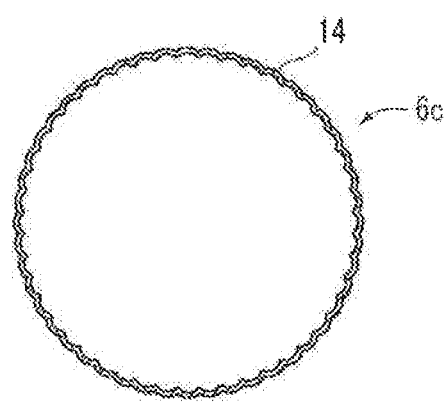
FIG. 3 is a cross-sectional view taken along the line III-III of FIG. 1.

In addition, the body portion 6 has a hand drum shape that gradually decreases in diameter from the lower end portion of the stepped portion 6a connected to the shoulder portion 5 toward the central portion 6c and gradually increases in diameter from the central portion 6c toward the upper end portion of the stepped portion 6b connected to the bottom portion 7. Further, the body portion 6 has a plurality of ribs 14 extending in the axial direction, where the ribs 14 are formed over the entire circumference of the outer peripheral surface of the central portion 6c of the body portion 6 as illustrated in FIG. 3.

The bottom portion 7 has a quadrangular pyramidal portion 15 in contact with the ground contact portion 9. At the upper side of the quadrangular pyramidal portion 15, the bottom portion 7 includes a lower body portion 16 connected to the body portion 6, where the diameter of the lower body portion 16 gradually increases away from the quadrangular pyramidal portion 15 toward the body portion 6 with the corners of the quadrangular pyramid gradually rounded corresponding to the increase in the diameter, and thus the lower body portion 16 continues to the body portion 6.

In addition, each of the quadrangular pyramidal portions 12 and 15 has a quadrangular cross section orthogonal to the axis and has a rounded shape with the vertex thereof treated such that it has a rounded profile, and ridge lines 12a and 15a are provided at the vertex. Here, the ridge line 15a continues to an extended line of the ridge line 12a.

Meanwhile, the inner container 3 has a cylindrical inner mouth portion 17 arranged on the inner peripheral side of the outer mouth portion 4, and an inner container body 18 connected to the inner mouth portion 17 and having a shape extending along the shape of the inner surfaces of the shoulder portion 5, the body portion 6, the bottom portion 7, the recessed portion 8, and the ground contact portion 9 of the outer shell bottle 2. The inner mouth portion 17 includes, at the upper portion, an extending portion 19, extending upward and past the upper end of the outer mouth portion 4, and a flange portion 20 projecting radially outwardly from the extending portion 19. The flange portion 20 has a transverse groove 22 formed on a lower surface thereof. The inner mouth portion 17 is locked by the flange portion 20 to the upper edge of the outer mouth portion 4.

In addition, the inner mouth portion 17 includes a longitudinal groove 21 on the outer peripheral surface. The longitudinal groove 21 is connected to the transverse groove 22 formed on the lower surface of the flange portion 20, and the transverse groove 22 is opened to the outside at the outer peripheral edge of the flange portion 20. As a result, the longitudinal groove 21 and the transverse groove 22 cooperate to define an air passage 23 formed between the outer mouth portion 4 and the inner mouth portion 17 for introducing the outside air into the gap between the outer shell bottle 2 and the inner container 3.

The synthetic resin multilayer bottle 1 can be manufactured, for example, by arranging an inner preform for forming the inner container 3 on the inner side of an outer preform for forming the outer shell bottle 2 and performing blow molding on these preforms at the same time. The blow molding can be carried out by a method well known as such and using a well-known blow molding apparatus.

Figure 4:
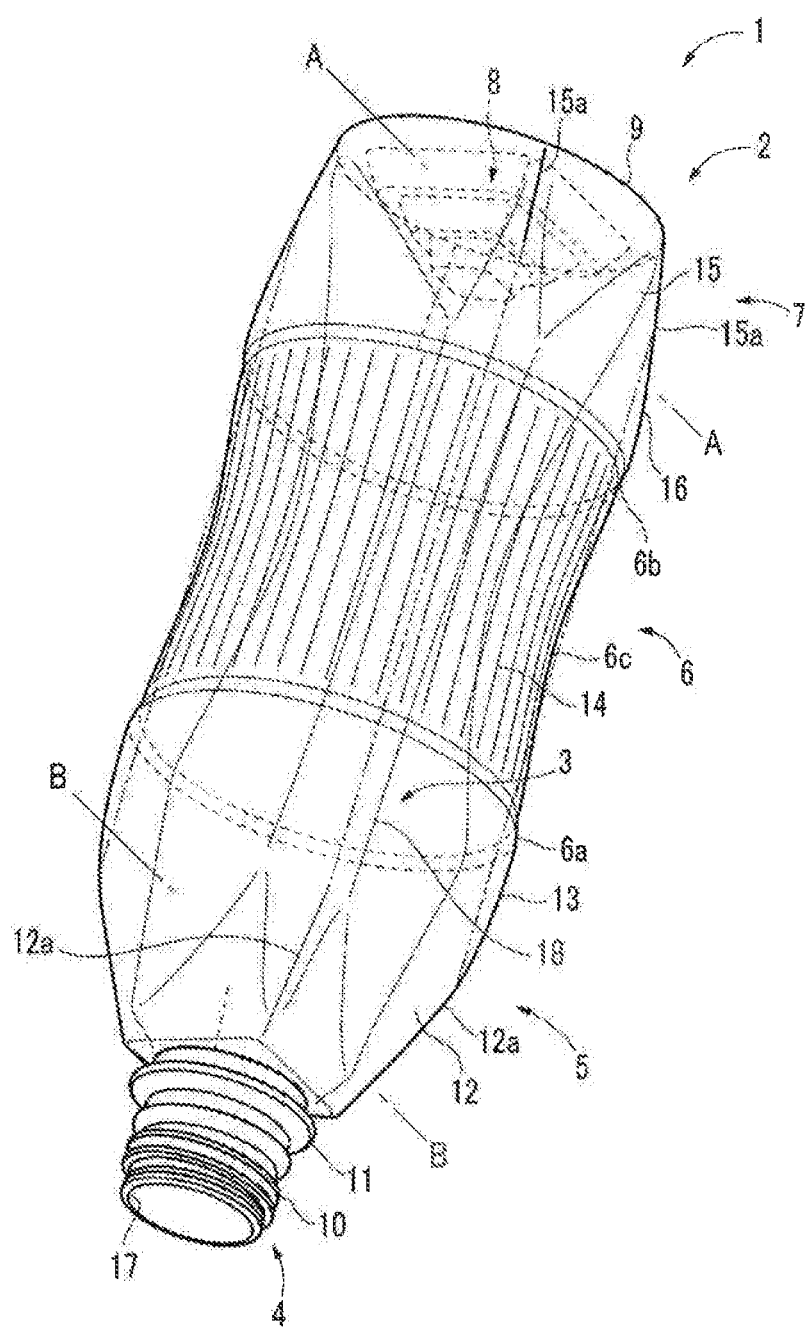
FIG. 4 is a perspective view illustrating a state of use of the synthetic resin multilayer bottle according to the first aspect of the present invention.

Modes of usage, operation, and effects of the synthetic resin multilayer bottle 1 according to this embodiment will now be described with reference to FIGS. 4, 5A, and 5B.

According to the synthetic resin multilayer bottle 1 of this embodiment, contents (not shown) are accommodated in the inner container 3, while a pouring cap (not shown) including a check valve connected to the air passage 23 and the inner mouth portion 17 are attached to the container mouth portion including the outer mouth portion 4 and the inner mouth portion 17. When pouring out the contents, the outer mouth portion 4 and the inner mouth portion 17 is oriented downward as illustrated in FIG. 4.

Then, when the body portion 6 is grasped by the outer shell bottle 2 and pressed, the inner container body 18 is deformed with its volume reduced and the contents are discharged. Since the cross section orthogonal to the axis of the synthetic resin multilayer bottle 1 is circular, the body portion 6 is allowed to be pressed in any direction with respect to the axis. Also, since the central portion 6c of the body portion 6 has a shape of a hand drum with the multiple ribs 14 formed in the axial direction, the central portion 6c can be easily grasped to deform the inner container body 18 with its volume reduced, making it possible to obtain excellent squeeze property.

Next, when the body portion 6 of the outer shell bottle 2 is taken out of the pressed state, the outside air is introduced via the air passage 23 into the gap between the outer shell bottle 2 and the inner container body 18. While the outer shell bottle 2 is restored to its original shape by the outside air pressure, the inner container body 18 is maintained in the deformed state by the operation of the check valve with its reduced volume maintained as well.

Figure 5A:
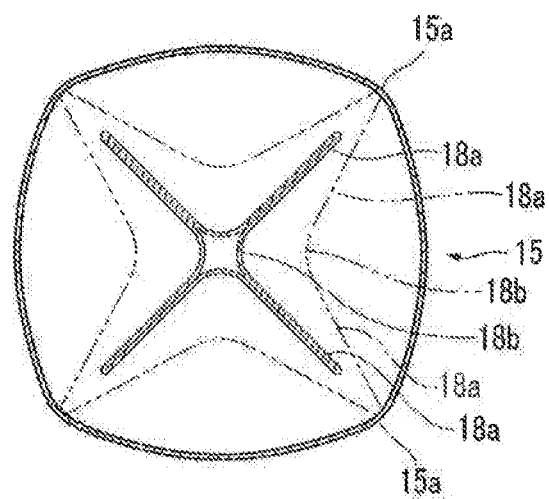
FIG. 5A is a cross-sectional view taken along the line A-A of FIG. 4.
Figure 5B:
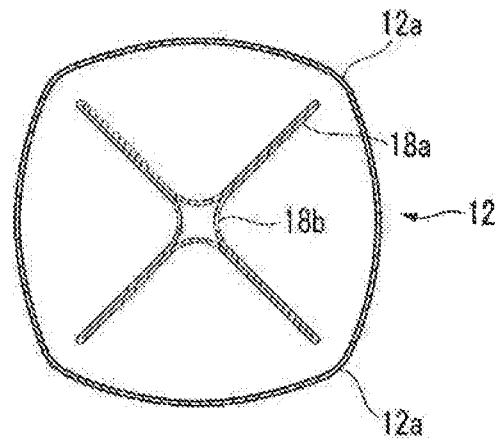
FIG. 5B is a cross-sectional view taken along the line B-B of FIG. 4.

At this point, since the contents are concentrated in the direction toward the inner mouth portion 17 by gravity, as illustrated in FIG. 5A, the inner container body 18 is depressed inwardly with a valley fold portion 18b created from the portion corresponding to the quadrangular pyramidal portion 15 of the bottom portion 7 of the outer shell bottle 2 to the center portion of the side portion 18a corresponding to the portion between the ridge lines 15a, 15a in the inner container body 18, and thus valley folding deformation is started.

According to the synthetic resin multilayer bottle 1 in accordance with this embodiment, a portion of the bottom portion 7 connected to the ground contact portion 9 of the outer shell bottle 2 is the quadrangular pyramidal portion 15, and the inner container body 18 has a shape extending along the internal shape of the outer shell bottle 2. As such, the valley folding deformation is expected to begin with the valley fold portion 18b being created at the center portion of the side portion 18a having a smaller strength as indicated by the virtual line in FIG. 5A, for the portion corresponding to the ridge lines 15a in the inner container body 18 acts as a rib and has a larger strength than that of the side portion 18a corresponding to the portion between the ridge lines 15a, 15a.

According to the synthetic resin multilayer bottle 1, by the action of the check valve connected to the air passage 23 of the pouring cap, the outside air flowing in via the air passage 23 is not discharged in spite of the pressing. In addition, by repeated pressing and stoppage of the pressing of the body portion 6 of the outer shell bottle 2, the outside air between the outer shell bottle 2 and the inner container body 18 increases, causing increase in the space therebetween, which presses the inner container 3 and deforms with its volume reduced, so that the contents in the inner container 3 decrease. When the contents decrease, the valley folding deformation of the inner container body 18 begins from the portion corresponding to the quadrangular pyramidal portion 15 of the bottom portion 7 of the outer shell bottle 2, proceeds from the outside to the inside of the inner container body 18 in the width direction and, as illustrated in FIG. 5A, the adjacent side portions 18a, 18a are brought into contact with each other and are deformed into a cross shape when viewed in the cross section.

In addition, the valley folding deformation of the inner container body 18 proceeds toward the inner mouth portion 17 in the longitudinal direction starting from the portion corresponding to the quadrangular pyramidal portion 15 of the bottom portion 7 of the outer shell bottle 2. At this point, as illustrated in FIG. 5A, the valley-folded and deformed portions 18a, 18b of the inner container body 18 are detached from the inner surface of the outer shell bottle 2 as the valley folding deformation progresses.

When the contents further decrease, the valley folding deformation of the inner container body 18 eventually reaches the portion corresponding to the shoulder portion 5 from the body portion 6 of the outer shell bottle 2. At this point, the ridge line 12a of the quadrangular pyramidal portion 12 of the shoulder portion 5 in the outer shell bottle 2 is found on the extended line from the ridge line 15a of the quadrangular pyramidal portion 15 of the bottom portion 7. Accordingly, the valley folding deformation in the inner container body 18 will proceed toward the side portion 18a corresponding to the portion between the ridge lines 12a, 12a of the quadrangular pyramidal portion 12 of the shoulder portion 5.

Further, at this point, the portion corresponding to the ridge line 12a of the quadrangular pyramidal portion 12 of the shoulder portion 5 of the inner container body 18 acts as a rib similarly to the portion corresponding to the ridge line 15a of the quadrangular pyramidal portion 15 of the bottom portion 7, so that the strength thereof becomes larger than that of the side portion 18a corresponding to the portion between the ridge lines 12a, 12a. Accordingly, as illustrated in FIG. 5B, the side portion 18a corresponding to the portion between the ridge lines 12a, 12a is easily valley-folded in a shape continuing to the valley folding deformation to create a valley fold portion 18b, and the adjacent side portions 18a, 18a are brought into contact with each other and deformed into a cross shape when viewed in the cross section.

As a result, the valley folding deformation will proceed for the entire inner container body 18 in the width direction from the outside to the inside of the inner container body 18, and in the length direction from portion corresponding to the quadrangular pyramidal portion 15 of the bottom portion 7 of the outer shell bottle 2 toward the inner mouth portion 17, so that the contents contained in the inner container body 18 can be fully poured out and the remaining liquid can be reduced.

In this embodiment, the quadrangular pyramidal portions 12, 15 in the outer shell bottle 2 each have a quadrangular pyramidal shape with a rectangular cross section taken along a line orthogonal to the axis. However, the quadrangular pyramidal portions 12, 15 may be changed to portions having at least one polygonal pyramidal shape taken from the group including a triangular pyramid shape having a triangular profile, a pentagonal pyramid shape having a pentagonal profile, and a hexagonal pyramid shape having a hexagonal profile as long and they have the same number of vertices. Further, the polygonal pyramid shape may have a polygonal profile whose vertices are cut off or rounded so as to have a rounded profile or may have an outwardly raised side extending between the vertices and such a raised side may further include one or more vertices thereon.

In addition, in this embodiment, the body portion 6 of the outer shell bottle 2 has a shape of a hand drum that is gradually reduced in diameter from the lower end portion of the stepped portion 6a connected to the shoulder portion 5 toward the central portion 6c, and gradually increases in diameter from the central portion 6c toward the upper end portion of the stepped portion 6b connected to the bottom portion 7. Meanwhile, the body portion 6 may have a cylindrical shape having the same diameter from the lower end portion of the stepped portion 6a to the upper end portion of the stepped portion 6b.

Further, in this embodiment, the external thread portion 10 is provided on the outer peripheral surface of the outer mouth portion 4, but the outer mouth portion 4 may have a simple cylindrical shape without the external thread portion 10 such that it may be implemented in a stopper-closed mouth portion or the like such as a soy sauce bottle or the like.

Next, a synthetic resin multilayer bottle 31 according to a second aspect of the present invention will be described with reference to FIGS. 6 to 9. The synthetic resin multilayer bottle 31 according to the second aspect can be made of polyester resin, for example.

Figure 6:
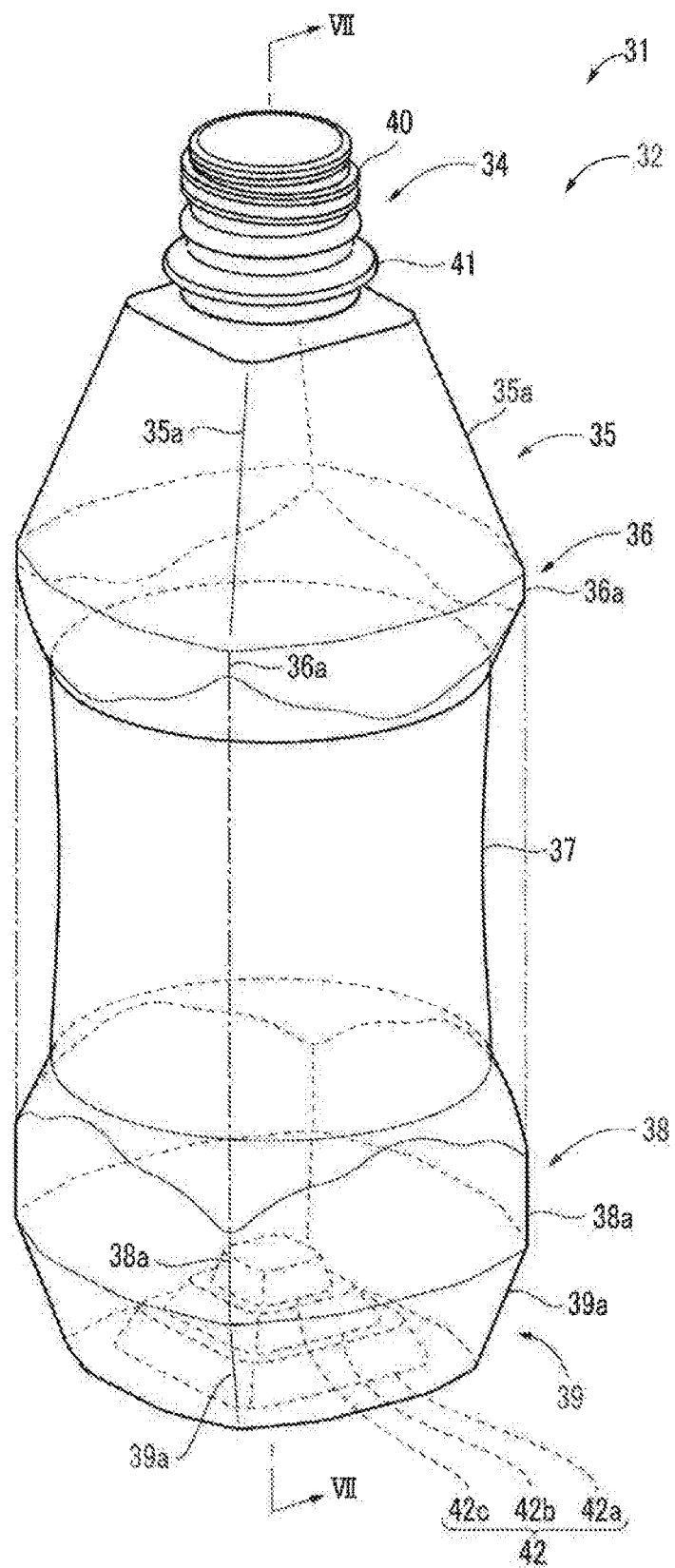
FIG. 6 is a perspective view illustrating a configuration of a synthetic resin multilayer bottle according to a second aspect of the present invention.
Figure 7:
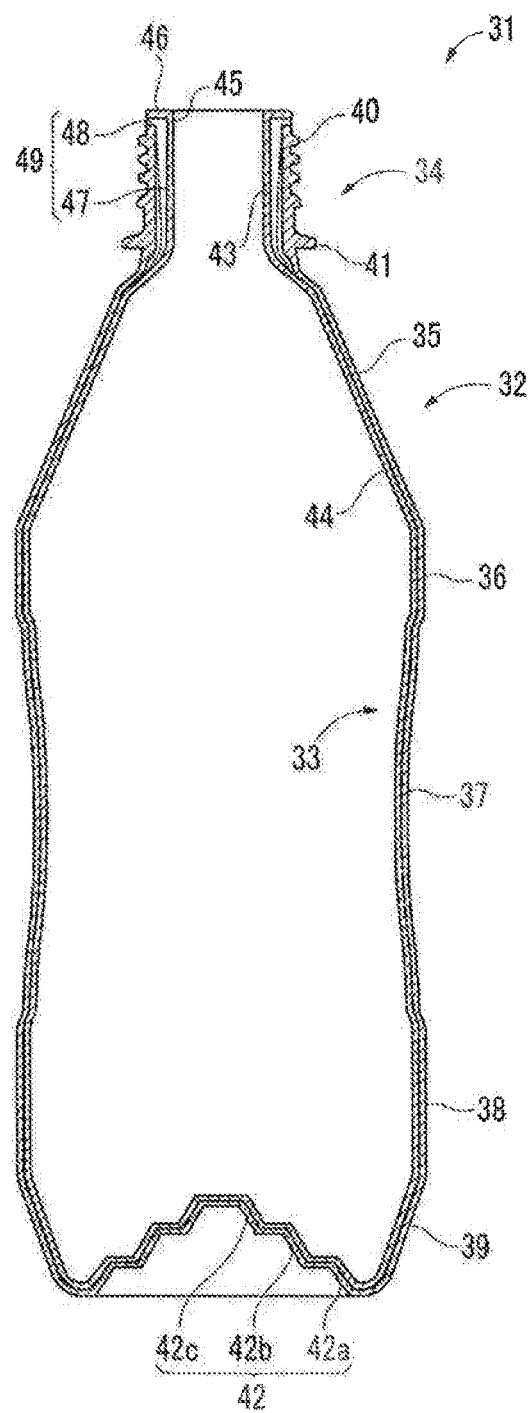
FIG. 7 is a cross-sectional view taken along the line VII-VII of FIG. 6.

As illustrated in FIGS. 6 and 7, the synthetic resin multilayer bottle 31 includes an outer shell bottle 32 capable of restoring itself to its original shape against external pressure and an inner container 33 accommodated inside the outer shell bottle 32 and adapted to be deformed by the external pressure.

The outer shell bottle 32 includes a cylindrical outer mouth portion 34, a quadrangular pyramidal shoulder portion 35 connected to the outer mouth portion 34, a quadrangular cylindrical upper body portion 36 connected to the shoulder portion 35, a cylindrical intermediate body portion 37 connected to the upper body portion 36, a quadrangular cylindrical lower body portion 38 connected to the intermediate body portion 37, and a quadrangular pyramidal bottom portion 39 connected to the lower body portion 38. The outer mouth portion 34 includes an external thread portion 40 and a support ring 41 on the outer peripheral surface thereof. The bottom portion 39 has a recessed portion 42 which is raised inwardly from the outer shell bottle 32 to give self-standing capability to the synthetic resin multilayer bottle 31.

In FIGS. 6 and 7, the recessed portion 42 has a shape in which polygonal frustum-like recesses are in multiple stage and includes, for example, a first polygonal frustum-like recessed portion 42a, a second polygonal frustum-like recessed portion 42b smaller than the first polygonal frustum-like recessed portion 42a and stacked on the first polygonal frustum-like recessed portion 42a within the inner circumference thereof, and a third polygonal frustum-like recessed portion 42c smaller than the second polygonal frustum-like recessed portion 42b and stacked on the second polygonal frustum-like recessed portion 42b within the inner circumference thereof. Meanwhile, according to the second aspect of the present invention, the shape of the recessed portion 42 is not limited to the above-described stacked shape of multiple polygonal frustum-like recessed portions but may be defined as any shape.

In addition, the shoulder portion 35, the upper body portion 36, the lower body portion 38, and the bottom portion 39 each have a rounded shape so as to have a rounded profile, where the vertices of a rectangle on the cross section orthogonal to the axis are rounded so as to provide a rounded profile, and ridge lines 35a, 36a, 38a, and 39a are provided at and between the vertices. Here, the ridge line 36a continues to the ridge line 35a and the ridge line 38a continues to the ridge line 39a. And the ridge line 38a continues to an extended line of the ridge line 36a.

Meanwhile, the inner container 33 has a cylindrical inner mouth portion 43 arranged on the inner circumferential side of the outer mouth portion 34, and an inner container body 44 connected to the inner mouth portion 43 and having a shape extending along the shape of the inner surfaces of the shoulder portion 35, the upper body portion 36, the intermediate body portion 37, the lower body portion 38, and the bottom portion 39 of the outer shell bottle 32. The inner mouth portion 43 includes, at the upper portion, an extending portion 45 extending upward and past the upper end of the outer mouth portion 34 and a flange portion 46 projecting radially outwardly from the extending portion 45. The inner mouth portion 43 is locked by the flange portion 46 to the upper edge of the outer mouth portion 34.

In addition, the inner mouth portion 43 includes a groove 47 on the outer peripheral surface. The groove 47 is connected to a groove 48 formed on the lower surface of the flange portion 46 and the groove 48 is opened to the outside at the outer peripheral edge of the flange portion 46. As a result, the groove 47 and the groove 48 define an air passage 49 for introducing the outside air into the gap between the outer shell bottle 32 and the inner container 33.

Modes of usage, operation, and effects of the synthetic resin multilayer bottle 31 will now be described with reference to FIGS. 8, 9A and 9B.

According to the synthetic resin multilayer bottle 31, contents (not shown) are accommodated in the inner container 33, while a pouring cap including a check valve (not shown) connected to the outer mouth air passage and the inner mouth portion are attached to the container mouth portion including the outer mouth portion 34 and the inner mouth portion 43. When pouring out the contents, the outer mouth portion 34 and the inner mouth portion 43 are inclined downward as illustrated in FIG. 8.

Then, when the intermediate body portion 37 of the outer shell bottle 32 is pressed, the inner container body 44 is deformed with its volume reduced and the contents are discharged. Since the intermediate body portion 37 of the synthetic resin multilayer bottle 31 is cylindrical, the intermediate body portion 37 may be pressed at any portion thereof in the circumferential direction and the inner container body 44 is allowed to be deformed with its volume reduced.

Next, when the intermediate body portion 37 of the outer shell bottle 32 is taken out of the pressed state, the outside air is introduced from the air passage 49 into the gap between the outer shell bottle 32 and the inner container body 44. While the outer shell bottle 32 is restored to its original shape by the outside air pressure, the inner container body 44 is maintained in the deformed state with its reduced volume maintained as well by the operation of the check valve.

Figure 9A:
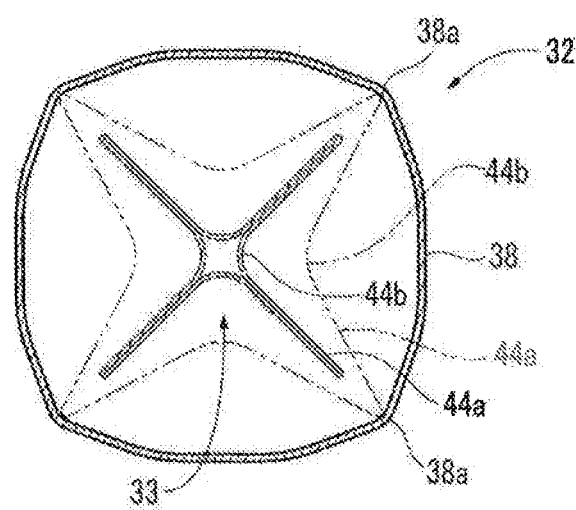
FIG. 9A is a cross-sectional view taken along the line A-A of FIG. 8.

At this point, since the contents are concentrated in the direction toward the inner mouth portion 43 by gravity, as illustrated in FIG. 9A, the inner container body 44 is depressed inwardly with valley fold portion 44b created from the portion corresponding to the lower body portion 38 of the outer shell bottle 32 to the center portion of the side portion 44a corresponding to the portion between the ridge lines 38a, 38a in the inner container body 44, and thus valley folding deformation is started.

According to the synthetic resin multilayer bottle 31, the lower body portion 38 of the outer shell bottle 32 has a quadrangular cylindrical shape and the inner container body 44 has a shape extending along the internal shape of the outer shell bottle 32. As such, the valley folding deformation is expected to begin with the valley fold portion 44b being created at the center portion of the side portion 44a having a smaller strength as indicated by the virtual line in FIG. 9A, for the portion corresponding to the ridge lines 38a in the inner container body 44 acts as a rib and has a larger strength than that of the side portion 44a corresponding to the portion between the ridge lines 38a, 38a.

According to the synthetic resin multilayer bottle 31, the contents decrease gradually by repeated pressing and stoppage of the pressing of the intermediate body portion 37 of the outer shell bottle 32. When the contents decrease, the valley folding deformation of the inner container body 44 begins from the portion corresponding to the lower body portion 38 of the outer shell bottle 32, proceeds from the outside to the inside of the inner container body 44 in the width direction and, as illustrated in FIG. 9A, the adjacent side portions 44a, 44a are brought into contact with each other and are deformed into a cross shape when viewed in the cross section.

In addition, the valley folding deformation of the inner container body 44 proceeds toward the inner mouth portion 43 in the longitudinal direction starting from the portion corresponding to the lower body portion 38 of the outer shell bottle 32. At this point, as illustrated in FIG. 9A, the valley folded and deformed portions of the inner container body 44 are detached from the inner surface of the outer shell bottle 32 as the valley folding deformation progresses.

When the contents further decrease, the valley folding deformation of the inner container body 44 eventually reaches the portion corresponding to the shoulder portion 35 from the upper body portion 36 of the outer shell bottle 32. At this point, the ridge line 36a of the upper body portion 36 is found on the extended line from the ridge line 38a of lower body portion 38 and the ridge line 35a of the shoulder portion 35 continues to the ridge line 36a of the upper body portion 36. Accordingly, the valley folding deformation in the inner container body 44 will proceed toward the side portion 44a corresponding to the portion between the ridge lines 36a, 36a of the upper body portion 36 and the ridge lines 35a, 35a of the shoulder portion 35.

Further, at this point, the portion corresponding to the ridge line 36a of the upper body portion 36 and the ridge line 35a of the shoulder portion 35 of the inner container body 44 acts as a rib similarly to the portion corresponding to the ridge line 38a of the lower body portion 38, so that the strength thereof becomes larger than that of the side portion 44a corresponding to the portion between the ridge lines 35a, 35a and the ridge lines 36a, 36a. Accordingly, as illustrated in FIG. 9B, the side portion 44a corresponding to the portion between the ridge lines 35a, 35a and the ridge lines 36a, 36a is easily valley-folded in a shape continuing to the valley folding deformation, and the adjacent side portions 44a and 44a are brought into contact with each other and deformed into a cross shape when viewed in the cross section.

As a result, the valley folding deformation will proceed for the entire inner container body 44 in the width direction from the outside to the inside of the inner container body 44, and in the length direction from portion corresponding to the lower body portion 38 of the outer shell bottle 32 toward the inner mouth portion 43, so that the contents contained in the inner container body 44 can be fully poured out and the remaining liquid can be reduced.

In this embodiment, the shoulder portion 35 and the bottom portion 39 of the outer shell bottle 32 each have a quadrangular pyramidal shape with a rectangular cross section taken along a line orthogonal to the axis. However, the shoulder portion 35 and the bottom portion 39 may have at least one polygonal pyramidal shape taken from the group including a triangular pyramidal shape having a triangular cross section orthogonal to the axis, a pentagonal pyramidal shape having a pentagonal cross section orthogonal to the axis, and a hexagonal pyramidal shape having a hexagonal cross section orthogonal to the axis as long as the shoulder portion 35 and the bottom portion 39 have the same number of vertices. Also, in this embodiment, the upper body portion 36 and the lower body portion 37 of the outer shell bottle 32 have a quadrangular cylindrical shape whose cross section orthogonal to the axis is quadrangular. However, the upper body portion 36 and the lower body portion 37 may have at least one polygonal cylindrical shape taken from the group including a triangular cylindrical shape having a triangular cross section orthogonal to the axis, a pentagonal cylindrical shape having a pentagonal cross section orthogonal to the axis, and a hexagonal cylindrical shape having a hexagonal cross section orthogonal to the axis as long as the upper body portion 36 and the lower body portion 37 have the same number of vertices as those of the shoulder portion 35 and the bottom portion 39.

Further, the polygonal pyramidal or polygonal cylindrical shape may have a polygonal shape whose vertices are cut off or rounded so as to have a rounded profile. Further, they may have an outwardly raised side extending between the vertices and such a raised side may further include one or more vertices thereon.

Further, in this embodiment, the external thread portion 40 is provided on the outer peripheral surface of the outer mouth portion 34, but the outer mouth portion 34 may have a simple cylindrical shape without the external thread portion 40 such that it may be implemented in a stopper-closed mouth portion or the like such as a soy sauce bottle or the like.

Next, a polyester resin blow-molded multilayer bottle according to a third aspect of the present invention will be described with reference to FIG. 6. The third aspect of the present invention is the same as the synthetic resin multilayer bottle 31 according to the second aspect except that the recessed portion 42 of the bottom portion 39 has a shape in which polygonal frustum-like recesses are stacked in multiple stage and is capable of achieving the same operation and effect as those of the synthetic resin multilayer bottle 31 of the second aspect in relation to pouring out the contents. Therefore, the polyester resin blow-molded multilayer bottle 31 of the third aspect of the present invention uses the same reference numerals as those for the synthetic resin multilayer bottle 31 of the second aspect for the sake of convenience.

In accordance with the polyester resin blow-molded multilayer bottle 31, the recessed portion 42 includes, for example, a first polygonal frustum-like recessed portion 42*a*, a second polygonal frustum-like recessed portion 42*b* smaller than the first polygonal frustum-like recessed portion 42*a* and stacked on the first polygonal frustum-like recessed portion 42*a* within the inner circumference thereof, and a third polygonal frustum-like recessed portion 42*c* smaller than the second polygonal frustum-like recessed portion 42*b* and stacked on the second polygonal frustum-like recessed portion 42*b* within the inner circumference thereof.

Figure 8:
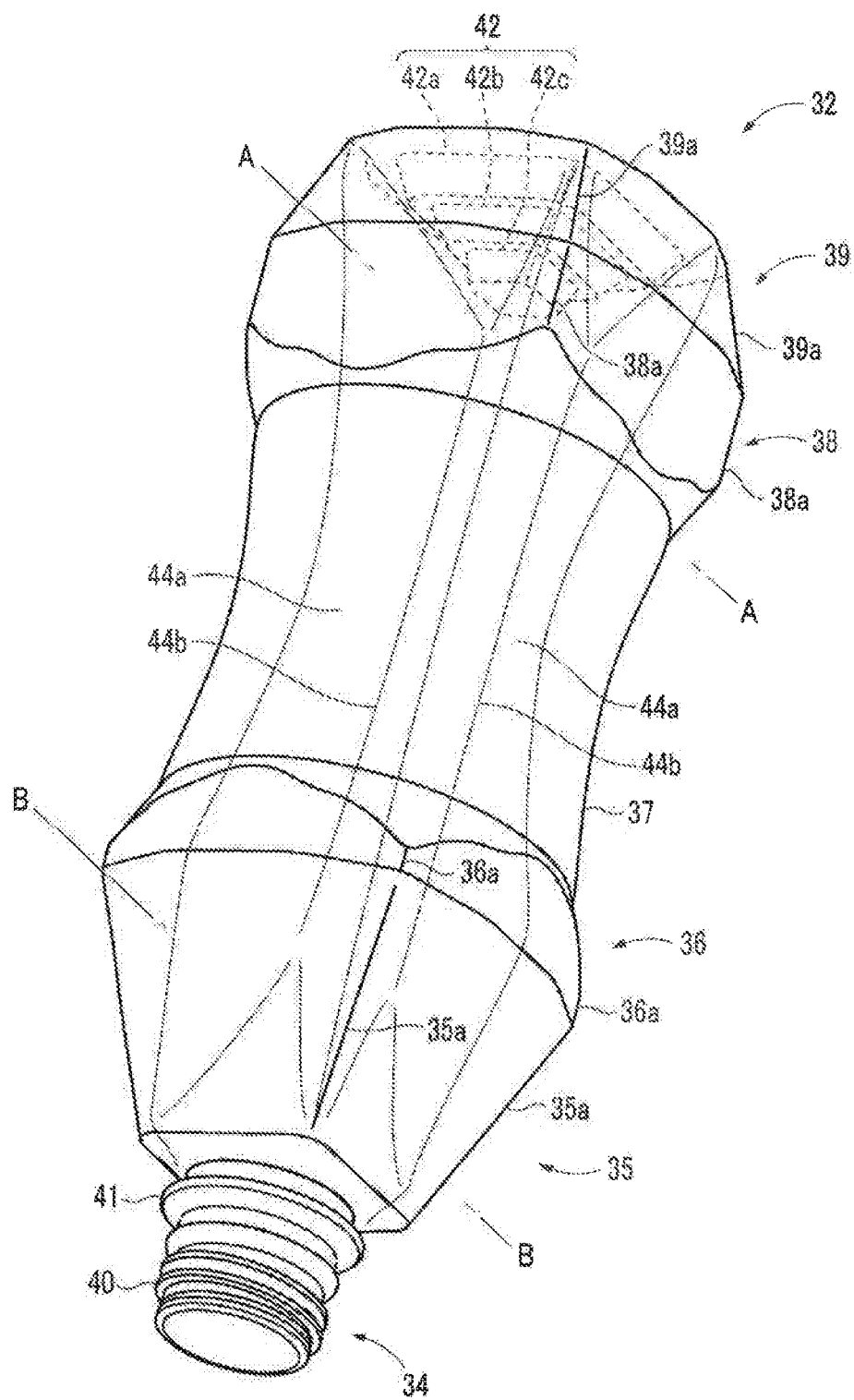
FIG. 8 is a perspective view illustrating a state of use of the synthetic resin multilayer bottle according to the second aspect of the present invention.
Figure 9B:
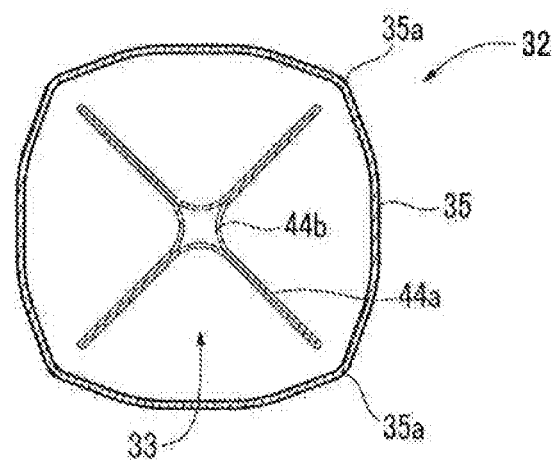
FIG. 9B is a cross-sectional view taken along the line B-B of FIG. 8.

In accordance with the polyester resin blow-molded multilayer bottle 31 whose recessed portion 42 has the above-described configuration, as illustrated in FIG. 8, when the valley folded portion 44*b* is formed in the length direction of the outer shell bottle 3, the recessed portion 42 includes the shape defined by the polygonal frustum-like recessed portions 42*a*, 42*b*, and 42*c*, so that the inner container body 44 is tightly in contact with the outer shell bottle 32. Also, since the recessed portion 42 is defined by the polygonal frustum-like recessed portions 42*a*, 42*b*, and 42*c* and thus includes multiple stepped portions and bent portions, the recessed portion 42 does not experience intrusion of the outside air into the gap between the outer shell bottle 32 and the inner container body 44.

Further, when the valley folded portion 44*b* is formed, the inner container body 44 has a property according to which the region continuing outwardly in the radial direction from the polygonal frustum-like recessed portion 42*a* is folded along the linear base of the polygonal frustum-like recessed portion 42*a* and falls inwardly in the radial direction and thus is spaced away from the inner surface of the outer shell bottle 32. As such, in accordance with the recessed portion 42, the tight contact of the inner container body 44 to the outer shell bottle 32 is maintained even after the valley folding deformation has started.

Accordingly, in accordance with the polyester resin blow-molded multilayer bottle 31, while the valley folded portion 44*b* is being formed in the length direction of the outer shell bottle 32, the bottom portion 39 will not experience detachment of the inner container body 44 from the outer shell bottle 32, making it possible to fully pour out the contents contained in the inner container body 44 and reduce the remaining liquid.

It should be noted that the recessed portion 42 of the polyester resin blow-molded multilayer bottle 31 should have a frustum shape, which may be a conical frustum or may be a polygonal frustum. Also, the recessed portion 42 should include multiple polygonal frustum-like recessed portions but is not limited to the three-state configuration defined by the polygonal frustum-like recessed portions 42*a*, 42*b*, and 42*c*.

Figure 11:
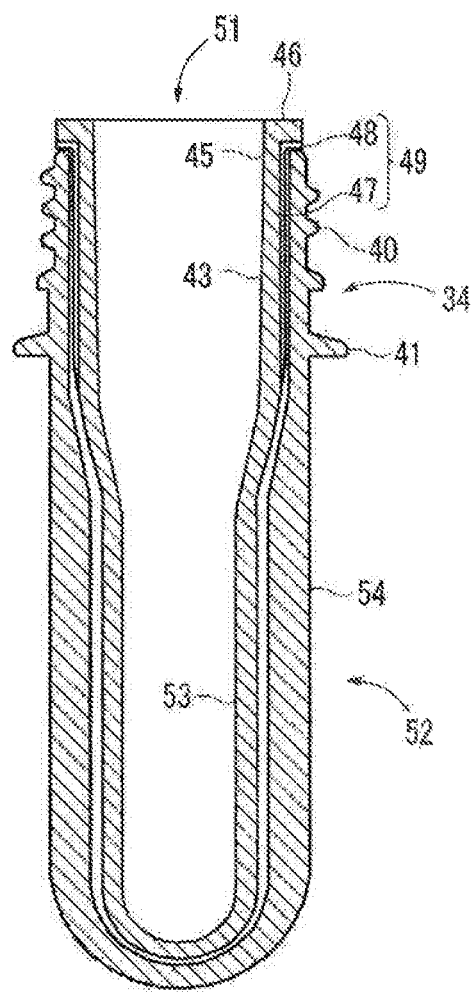
FIG. 11 is a longitudinal cross-sectional view illustrating a state in which an inner preform for use in manufacturing the polyester resin blow-molded multilayer bottle according to the third aspect of the present invention is arranged on an inner peripheral side of an outer preform.

The synthetic resin multilayer bottle 1 of the first aspect of the present invention, the synthetic resin multilayer bottle 31 of the second aspect, and the polyester resin blow-molded multilayer bottle 31 of the third aspect can be manufactured, for example, by arranging the inner preform 51 illustrated in FIG. 10 inside of the outer preform 52 illustrated in FIG. 11 and performing blow molding on these preforms at the same time. Next, the synthetic resin multilayer bottle 1 of the first aspect, the synthetic resin multilayer bottle 31 of the second aspect, and the polyester resin blow-molded multilayer bottle 31 of the third aspect will be described with reference to the case of the polyester resin blow-molded multilayer bottle 31 of the third aspect.

The inner preform 51 is formed by injection molding using as its material, for example, polyester synthetic resin such as polyethylene terephthalate. As illustrated in FIG. 10, The inner preform 51 is formed by an inner mouth portion 43 and a bottomed cylindrical inner body part 53 connected to the lower portion of the inner mouth portion 43 and having an outer diameter smaller than that of the inner mouth portion 43. The inner mouth portion 43 has the same shape as the inner mouth portion 43 of the inner container 33, and the same components are denoted by the same reference numerals and the detailed description thereof is omitted. Since the outer diameter of the inner body portion 53 is smaller than the inner mouth portion 43, the lower end of the groove 47 faces the outer surface of the inner body portion 53 and is opened at the boundary between the inner mouth portion 43 and the inner body portion 53.

The outer preform 52 is formed by injection molding using polyester synthetic resin such as polyethylene terephthalate as its material. As illustrated in FIG. 11, the outer preform 52 is formed by an outer mouth portion 34 and a bottomed cylindrical outer body portion 54 connected to the lower portion of the outer mouth portion 34. The outer mouth portion 34 has the same shape as that of the outer mouth portion 34 of the outer shell bottle 32, and the same components are denoted by the same reference numerals and the detailed description thereof is omitted.

As illustrated in FIG. 11, the inner mouth portion 43 of the inner preform 51 is attached to and inserted into the outer mouth portion 34 of the outer preform 52, and the inner body portion 53 of the inner preform 51 is arranged inside of the outer body portion 54 of the outer preform 52. At this point, the extending portion 45 extends upward past the outer mouth portion 34 of the outer preform 52, and the flange portion 46 is brought into abutment on the upper end face of the outer mouth portion 34 of the outer preform 52 and thus brought into locking therewith. As a result, the inner mouth portion 43 of the inner preform 51 is reliably positioned inside the outer mouth portion 34 of the outer preform 52.

In the case of the synthetic resin multilayer bottle 1 of the first aspect and the synthetic resin multilayer bottle 31 of the second aspect, the inner preform 51 or the outer preform 52 may be made of a synthetic resin other than the polyester resin.

A blow molding apparatus used for a blow molding method of the polyester resin blow-molded multilayer bottle 31 is well known and includes a mold 61, a blow nozzle 62, and a stretch rod 63, where the principal portions thereof are illustrated in FIGS. 12A to 12C.

The mold 61 has a shaping portion 64 having a shape confirming to the shoulder portion 35, the upper body portion 36, the intermediate body portion 37, the lower body portion 38, and the bottom portion 39 of the outer shell bottle 32; a bottom shaping portion 65 having a shape extending along the polygonal frustum-like recessed portion 42a, 42b, and 42c of the bottom portion 42; and a support opening 66 for exposing the upper portion from and upper than the support ring 41 of the outer mouth part 34 of the outer preform 52 to support the upper portion. The mold 61 has a split structure (not shown), where the mold 61 is split into the left and right sides and the bottom side so that the polyester resin blow-molded multilayer bottle 31 that has been shaped can be taken out of the mold 61.

The blow nozzle 62 is raised and lowered by an elevating means (not shown) and is brought into airtight abutment on the upper end face of the flange portion 46 of the inner preform 51 via an O-ring 67. The stretch rod 63 is inserted into the blow nozzle 62 to extend therethrough and a gas passage 68 connected to a high pressure gas supply means (not shown) is formed between the outer peripheral surface of the stretch rod 63 and the inner peripheral surface of the blow nozzle 62.

The stretch rod 63 is advanced at the time of blow molding by an advance and retreat driving means (not shown). In FIG. 12A, the stretch rod 63 protrudes from the tip of the blow nozzle 62, but when the stretch rod 63 is not in use, it is retreated and stored inside the blow nozzle 62 (upward in the figure).

When the polyester resin blow-molded multilayer bottle 31 is manufactured by the blow molding apparatus having the above-described configuration, as illustrated in FIG. 12A, the inner preform 51 is attached to and inserted into the outer preform 52, and the inner preform 51 and the outer preform 52 are set in the mold 61, and then the blow nozzle 62 is connected to the inner mouth portion 43 of the inner preform 51. The inner preform 51 and the outer preform 52 are heated to a temperature at which blow molding can be performed prior to being set in the mold 61.

Then, as illustrated in FIG. 12B, pressurized air is introduced into the inner preform 51 via the gas passage 68 of the blow nozzle 62, and at the same time, the stretch rod 63 is extended downward. As a result, the inner preform 51 expands and is brought into tight contact with the inner surface of the yet-to-be expanded outer preform 52.

Subsequently, when the stretch rod 63 is extended downward while further introducing pressurized air into the inner preform 51 from the state illustrated in FIG. 12B, the outer body portion 54 of the outer preform 52 is expanded by the inner body portion 53 of the expanded inner preform 51 as illustrated in FIG. 12C and shaped by the shaping portion 64 of the mold 61 into the shape of the shoulder portion 35, the upper body portion 36, the intermediate body portion 37, the lower body portion 38, and the bottom portion 39 of the outer shell bottle 32, and shaped by the bottom shaping portion 65 into the shape of the recessed portion 42. In addition, the inner body portion 53 of the inner preform 51 is shaped into a shape extending along the inner shape of the shoulder portion 35, the upper body portion 36, the intermediate body portion 37, the lower body portion 38, the bottom portion 39, and the recessed portion 42 of the outer shell bottle 32. As a result, the polyester resin blow-molded multilayer bottle 31 having the structure illustrated in FIGS. 6 and 7 is obtained.

In accordance with the polyester resin blow-molded multilayer bottle 31, when the recessed portion 42 is formed by the blow molding, the inner preform 51 is thermocompression-bonded to the outer preform 52, and thereby the inner container body 44 is brought into tight contact with the outer shell bottle 32.

When performing blow molding of the synthetic resin multilayer bottle 1 of the first aspect and the synthetic resin multilayer bottle 31 of the second aspect, the bottom shaping portion 65 of the mold 61 does not need to have a shape extending along the polygonal frustum-like recessed portions 42a, 42b, and 42c of the bottom portion 42.

By the way, the polyester resin blow-molded multilayer bottle 31 may involve a problem that the inner container body 44 is brought into firm contact with the outer shell bottle 32 due to heat and pressure during the blow molding and the outer shell bottle 32 and the inner container body 44 cannot be easily separated from each other. This problem is particularly conspicuous when the polyester resin for forming the polyester resin blow-molded multilayer bottle 31 is polyethylene terephthalate.

In view of the above, the polyester resin blow-molded multilayer bottle 31 of a fourth aspect of the present invention, in the context of the polyester resin blow-molded multilayer bottle 31 according to the third aspect of the present invention, comprises a release agent layer (not shown) containing liquid paraffin provided between the outer shell bottle 32 and the inner container body 44. The polyester resin blow-molded multilayer bottle 31 of the fourth aspect of the present invention has exactly the same shape as that of the polyester resin blow-molded multilayer bottle 31 of the third aspect except that it has the release agent layer. For the sake of convenience, the same reference numerals as those of the polyester resin blow-molded multilayer bottle 31 of the third aspect are used.

In accordance with the polyester resin blow-molded multilayer bottle 31 of the fourth aspect, the release agent layer specifically is provided between the shoulder portion 35, the upper body portion 36, the intermediate body portion 37, and the lower body portion 38, and the bottom portion 39 except for the recessed portion 42 of the outer shell bottle 32 and the portion of the inner container body 44 extending along the shoulder portion 35, the upper body portion 36, the intermediate body portion 37, and the lower body portion 38 and the bottom portion 39 except for the recessed portion 42. The release agent layer should be provided in the above-identified portion, but it may be further provided on the inner surface of the outer mouth portion 34 of the outer shell bottle 32 or the outer surface of the inner mouth portion 43 of the inner container 33.

The release agent forming the release agent layer contains liquid paraffin having Saybolt universal viscosity in the range of 75 to 300 SUS at 100° F., and preferably in the range of 159 to 175 SUS. The release agent may be composed solely of the liquid paraffin or may contain a solvent of the flowing paraffin and may be used by adding an additive having other releasing effect to liquid paraffin as desired.

Since the liquid paraffin is not likely to be volatilized by heating at the time of blow molding which will be described later and use of it as a food additive is permitted, it is not likely to cause health damage or the like even if it is mixed in the contents. As the liquid paraffin, for example, HICALL K-290 (product name) manufactured by KANEDA Co., Ltd can be used.

The polyester resin blow-molded multilayer bottle 31 of the fourth aspect can be manufactured by, for example, arranging the inner preform 51 illustrated in FIG. 10 inside the outer preform 52 illustrated in FIG. 11 and performing blow molding on these preforms. As illustrated in FIG. 11, when the bottomed tubular body 53 of the inner preform 51 is arranged inside the bottomed tubular body 54 of the outer preform 52, the release agent layer should be applied to at least either of the outer surface of the bottomed tubular body 53 or the inner surface of the bottomed tubular body 54, but it is preferable that the release agent is applied on the inner surface of the bottomed tubular body 54 in terms of ease of application.

REFERENCE SIGNS LIST

1: synthetic resin multilayer bottle; 2: outer shell bottle; 3: inner container; 4: outer mouth portion; 5: shoulder portion; 6: body portion; 7: bottom portion; 9: ground contact portion; 17: cylindrical inner mouth portion; 18: inner container body; 23: air passage; 31: synthetic resin multilayer bottle (polyester resin blow-molded multilayer bottle); 32: outer shell bottle; 33: inner container; 34: cylindrical outer mouth portion; 35: shoulder portion; 36: upper body portion; 37: intermediate body portion; 38: lower body portion; 39: bottom portion; 40: external thread portion; 42: recessed portion; 43: cylindrical inner mouth portion; 44: inner container body; 49: air passage

The invention claimed is:

1. A polyester resin multilayer bottle comprising:
   an outer shell bottle including
      a cylindrical outer mouth portion,
      a shoulder portion connected to the outer mouth portion,
      a body portion connected to the shoulder portion,
      a bottom portion connected to the body portion, and
      a ground contact portion connected to the bottom portion,
   the shoulder portion having a polygonal pyramidal shape, at least at a portion thereof connected to the outer mouth portion,
   the body portion having a circular cross section orthogonal to an axis,
   the bottom portion having a polygonal pyramidal shape, at least at a portion thereof connected to the ground contact portion, the polygonal pyramidal shape having ridge lines continuing to extended lines of polygonal pyramidal ridge lines of the shoulder portion;
   an inner container including
      a cylindrical inner mouth portion arranged on an inner circumferential side of the cylindrical outer mouth portion of the outer shell bottle, and
      an inner container body connected to the inner mouth portion and having a shape extending along an internal shape of the outer shell bottle,
   wherein:
   the inner container body is brought into firm but separable contact with the outer shell bottle,
   portions of the inner container body, corresponding to the ridge lines of the shoulder portion and the bottom portion, form fold lines by the firm but separable contact,
   the inner container body has side portions between the fold lines,
   an air passage is formed between the outer mouth portion and the inner mouth portion for introducing outside air into a gap between the outer shell bottle and the inner container,
   the outer shell bottle is configured to be restored due to its elasticity to its original shape when outside air is introduced via the air passage by the body portion of the outer shell bottle is released from a pressed state after the body potion is squeezed, and
   the inner container is configured to be deformed to reduce its volume by pressing the body portion of the outer shell bottle, whereby the inner container is separated from the outer shell bottle, and each side portion of the inner container body becomes a valley fold portion and is depressed inwardly, and adjacent side portions of the inner container body are brought into contact with each other.

2. The polyester resin multilayer bottle according to claim 1, wherein the body portion has a shape whose diameter gradually decreases from the portion connected to the shoulder portion to a central portion and gradually increases from the central portion to the portion connected to the bottom portion.

3. The polyester resin multilayer bottle according to claim 1, wherein the body portion includes a plurality of ribs extending in an axis direction.

4. A polyester resin multilayer bottle comprising an outer shell bottle and an inner container,
   the outer shell bottle including
      a cylindrical outer mouth portion,
      a polygonal pyramidal shoulder portion connected to the outer mouth portion,
      a polygonal cylindrical upper body portion connected to the shoulder portion and including ridge lines continuing to polygonal pyramidal ridge lines,
      an intermediate body portion connected to the upper body portion,
      a polygonal cylindrical lower body portion connected to the intermediate body portion and including ridge lines continuing to extended lines of the ridge lines of the polygonal cylindrical upper body portion, and
      a bottom portion connected to the lower body portion;
   the inner container including
      a cylindrical inner mouth portion arranged on an inner circumferential side of the cylindrical outer mouth portion of the outer shell bottle, and
      an inner container body connected to the inner mouth portion and having a shape extending along an internal shape of the outer shell bottle,
   wherein:
   the inner container body is brought into firm but separable contact with the outer shell bottle,
   portions of the inner container body corresponding to the ridge lines of the shoulder portion and the bottom portion form fold lines by the firm but separable contact,
   the inner container body has side portions between the fold lines,
   an air passage is formed between the outer mouth portion and the inner mouth portion for introducing outside air into a gap between the outer shell bottle and the inner container,
   the outer shell bottle is configured to be restored due to its elasticity to its original shape when outside air is introduced via the air passage by the body portion of the outer shell bottle is released from a pressed state after the body potion is squeezed, and the inner container is configured to be deformed to reduce its volume by pressing the body portion of the outer shell bottle, whereby the inner container is separated from the outer shell bottle, and each side portion of the inner container body becomes a valley fold portion and is depressed inwardly, and adjacent side portions of the inner container body are brought into contact with each other.

5. A polyester resin blow-molded multilayer bottle comprising:

an outer shell bottle including
  a cylindrical outer mouth portion,
  a shoulder portion connected to the outer mouth portion,
  a body portion connected to the shoulder portion,
  a bottom portion connected to the body portion and having a recessed portion raised on the inner circumferential side into the bottle, the outer shell bottle being capable of restoring by its elasticity to its original shape after the body portion is squeezed and released; and an inner container including
  a cylindrical inner mouth portion arranged on an inner circumferential side of the cylindrical outer mouth portion of the outer shell bottle, and
  an inner container body connected to the inner mouth portion and having a shape extending along an internal shape of the outer shell bottle, the inner container being configured to be deformed by external pressure;

wherein an air passage is formed between the outer mouth portion and the inner mouth portion for introducing outside air into a gap between the outer shell bottle and the inner container, the recessed portion has a stepped shape defined by multiple stacked polygonal frustum-like recessed portions, the inner container and the outer shell bottle are in tight contact with each other at the recessed potion, the bottom portion has a truncated inverted polygonal pyramidal shape created by a plurality of side surfaces forming ridge lines therebetween, each polygonal frustum-like recessed portion has ridge lines, and corresponding ridge lines between each recessed portion and the truncated inverted polygonal pyramidal shape are located in the same angle position in the direction around a center axis of the bottle.

6. The polyester resin blow-molded multilayer bottle according to claim 5, wherein a liquid paraffin layer is provided at least between the shoulder portion, the body portion, and the bottom portion except for the recessed portion of the outer shell bottle and the portion of the inner container extending along the shoulder portion, the body portion, and the bottom portion except for the recessed portion.

7. The polyester resin multilayer bottle according to claim 1, wherein the polygonal pyramidal shape is one taken from the group including a quadrangular pyramidal shape, a triangular pyramid shape, a pentagonal pyramid shape, and a hexagonal pyramid shape.

8. The polyester resin multilayer bottle according to claim 4, wherein the polygonal pyramidal shape is one taken from the group including a quadrangular pyramidal shape, a triangular pyramid shape, a pentagonal pyramid shape, and a hexagonal pyramid shape, and the polygonal cylindrical shape is one taken correspondingly to the polygonal pyramidal shape from the group including a quadrangular cylindrical shape, a triangular cylindrical shape, a pentagonal cylindrical shape, and a hexagonal cylindrical shape.

9. A synthetic resin multilayer bottle comprising:

an outer shell bottle including
  a cylindrical outer mouth portion,
  a shoulder portion connected to the outer mouth portion,
  a body portion connected to the shoulder portion,
  a bottom portion connected to the body portion,
  a ground contact portion connected to the bottom portion, the outer shell bottle being capable of restoring by its elasticity to its original shape after the body portion is squeezed and released;

an inner container including
  a cylindrical inner mouth portion arranged on an inner circumferential side of the cylindrical outer mouth portion of the outer shell bottle, and
  an inner container body connected to the inner mouth portion and having a shape extending along an internal shape of the outer shell bottle, the inner container being configured to be deformed by external pressure;

wherein an air passage is formed between the outer mouth portion and the inner mouth portion for introducing outside air into a gap between the outer shell bottle and the inner container, and wherein the portion of the shoulder portion in contact with the outer mouth portion defines a polygonal pyramidal portion, at the lower side of polygonal pyramidal portion, the shoulder portion includes an upper body portion connected to the body portion having a circular cross section orthogonal to its axis, the diameter of the upper body portion gradually increases away from the polygonal pyramidal portion toward the body portion with the corners of the polygonal pyramid gradually rounded, the bottom portion has a polygonal pyramidal portion in contact with the ground contact portion, the polygonal pyramidal portion of the bottom portion has a plurality of ridge lines, each continuing to a corresponding ridge line of the polygonal portion of the shoulder portion, and at the upper side of the polygonal pyramidal portion of the bottom portion, the bottom portion includes a lower body portion connected to the body portion, where the diameter of the lower body portion gradually increases away from the polygonal pyramidal portion toward the body portion with the corners of the polygonal pyramid gradually rounded.

* * * * *